(12) United States Patent
Fender et al.

(10) Patent No.: US 12,407,764 B2
(45) Date of Patent: *Sep. 2, 2025

(54) SECURELY EXPOSING AN ACCELERATOR TO PRIVILEGED SYSTEM COMPONENTS

(71) Applicant: INTEL CORPORATION, Santa Clara, CA (US)

(72) Inventors: Joshua Fender, East York (CA); Utkarsh Y. Kakaiya, Folsom, CA (US); Mohan Nair, Portland, OR (US); Brian Morris, Santa Clara, CA (US); Pratik Marolia, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 219 days.

This patent is subject to a terminal disclaimer.

(21) Appl. No.: 18/072,368

(22) Filed: Nov. 30, 2022

(65) Prior Publication Data

US 2023/0145856 A1 May 11, 2023

Related U.S. Application Data

(63) Continuation of application No. 16/912,076, filed on Jun. 25, 2020, now abandoned, which is a
(Continued)

(51) Int. Cl.
*G06F 21/00* (2013.01)
*G06F 1/20* (2006.01)
(Continued)

(52) U.S. Cl.
CPC ............ *H04L 67/562* (2022.05); *G06F 1/206* (2013.01); *G06F 1/3206* (2013.01); *G06F 1/324* (2013.01);
(Continued)

(58) Field of Classification Search
None
See application file for complete search history.

(56) References Cited

U.S. PATENT DOCUMENTS

| 7,233,830 B1 * | 6/2007 | Callaghan | G05B 19/4188 |
| | | | 700/20 |
| 7,290,284 B1 * | 10/2007 | Wettergren | G06F 21/6218 |
| | | | 726/16 |

(Continued)

OTHER PUBLICATIONS

Notice of Allowance, U.S. Appl. No. 16/024,022, Apr. 23, 2020, 20 pages.

(Continued)

*Primary Examiner* — Shin-Hon (Eric) Chen
(74) *Attorney, Agent, or Firm* — Nicholson De Vos Webster & Elliott LLP

(57) ABSTRACT

Various embodiments are generally directed to securing systems that include hardware accelerators, such as FPGA-based accelerators, and privileged system components. Some embodiments may provide a security broker. In various embodiments, the security broker may provide interfaces between the hardware accelerator and the privileged component. Some embodiments may receive an instruction from the hardware accelerator targeting the privileged component, and validate the instruction based on a configuration. In some embodiments, upon determining the instruction is not validated, the instruction is restricted from further processing.

25 Claims, 15 Drawing Sheets

Related U.S. Application Data continuation of application No. 16/024,022, filed on Jun. 29, 2018, now Pat. No. 10,762,244.

(51) Int. Cl.

| | | |
|---|---|---|
| *G06F 1/3206* | (2019.01) | |
| *G06F 1/324* | (2019.01) | |
| *G06F 11/14* | (2006.01) | |
| *G06F 21/54* | (2013.01) | |
| *G06F 21/74* | (2013.01) | |
| *H04L 67/562* | (2022.01) | |
| *H04L 69/12* | (2022.01) | |
| *G06F 1/3287* | (2019.01) | |
| *G06F 21/76* | (2013.01) | |

(52) U.S. Cl.
CPC .......... *G06F 11/1441* (2013.01); *G06F 21/54* (2013.01); *G06F 21/74* (2013.01); *H04L 69/12* (2013.01); *G06F 1/3287* (2013.01); *G06F 21/76* (2013.01); *G06F 2221/2149* (2013.01)

(56) References Cited

U.S. PATENT DOCUMENTS

| | | | | |
|---|---|---|---|---|
| 8,788,787 | B2* | 7/2014 | Mott | G06F 12/10 |
| | | | | 711/202 |
| 8,973,158 | B2* | 3/2015 | Abraham | G06F 21/51 |
| | | | | 726/29 |
| 9,256,734 | B2* | 2/2016 | Buer | G06F 21/85 |
| 2009/0327514 | A1* | 12/2009 | Foschiano | H04L 45/00 |
| | | | | 709/233 |
| 2011/0161619 | A1* | 6/2011 | Kaminski | G06F 12/1027 |
| | | | | 711/E12.016 |
| 2014/0283039 | A1* | 9/2014 | Wang | G06F 12/14 |
| | | | | 726/22 |
| 2016/0283404 | A1* | 9/2016 | Xing | G06F 3/0632 |
| 2016/0315922 | A1 | 10/2016 | Chew et al. | |
| 2016/0373416 | A1* | 12/2016 | Burger | G06F 21/72 |
| 2017/0024584 | A1 | 1/2017 | Chhabra et al. | |
| 2017/0026040 | A1 | 1/2017 | Hammond et al. | |
| 2017/0032132 | A1 | 2/2017 | McGowan | |
| 2017/0090800 | A1 | 3/2017 | Alexandrovich et al. | |
| 2017/0226040 | A1* | 8/2017 | Jeremias | C07C 63/307 |
| 2018/0114013 | A1* | 4/2018 | Sood | G06F 21/606 |
| 2018/0189092 | A1* | 7/2018 | Sanchez Leighton | |
| | | | | G06F 9/45558 |
| 2018/0191682 | A1* | 7/2018 | Liu | H04L 41/0895 |
| 2018/0278583 | A1* | 9/2018 | Cela | H04L 63/061 |
| 2018/0278588 | A1* | 9/2018 | Cela | H04L 63/0227 |
| 2018/0293407 | A1* | 10/2018 | Wu | G06F 21/602 |
| 2019/0018800 | A1* | 1/2019 | Jayasena | G06F 9/45558 |
| 2021/0111863 | A1* | 4/2021 | Trivedi | H04L 9/0894 |

OTHER PUBLICATIONS

Notice of Allowance, U.S. Appl. No. 16/912,076, Sep. 12, 2022, 20 pages.

Notice of Imported Citations, U.S. Appl. No. 16/912,076, Aug. 28, 2020, 1 pages.

\* cited by examiner

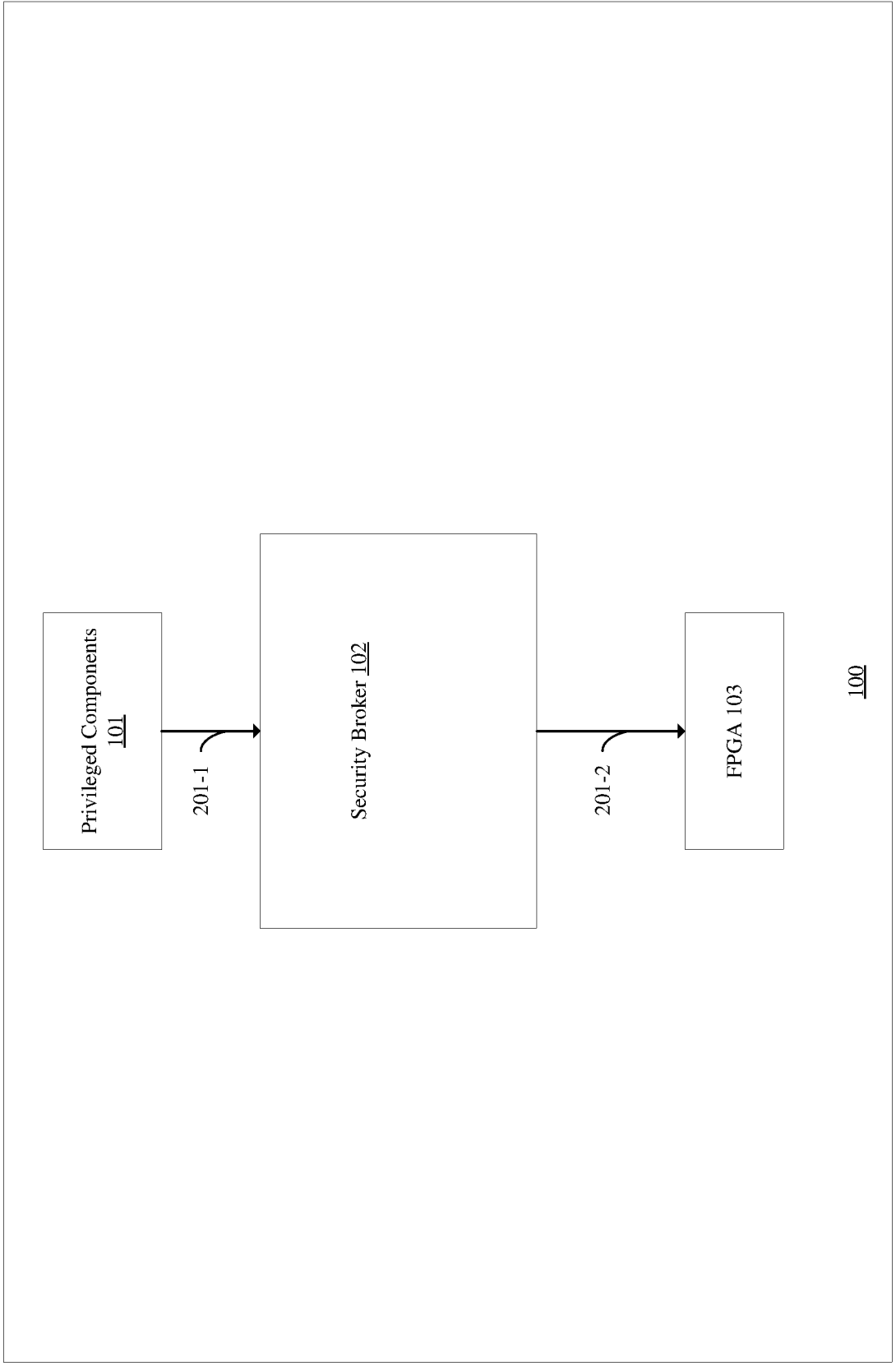

SECURELY EXPOSING AN ACCELERATOR TO PRIVILEGED SYSTEM COMPONENTS

CROSS-REFERENCE TO RELATED APPLICATIONS

This application is a continuation of, claims the benefit of and priority to previously filed U.S. patent application Ser. No. 16/912,076 filed Jun. 25, 2020, entitled "SECURELY EXPOSING AN ACCELERATOR TO PRIVILEGED SYSTEM COMPONENTS", which is a continuation of, claims the benefit of and priority to previously filed U.S. patent application Ser. No. 16/024,022 filed Jun. 29, 2018, entitled "SECURELY EXPOSING AN ACCELERATOR TO PRIVILEGED SYSTEM COMPONENTS", which are hereby incorporated by reference in their entirety.

TECHNICAL FIELD

Embodiments herein generally relate to securing systems which include accelerators, including but not limited to field-programmable gate array (FPGA) based accelerators.

BACKGROUND

FPGAs are semiconductor integrated circuits that can be configured after manufacturing. Generally, an FPGA includes an array of programmable logic blocks connected via programmable interconnects. As such, FPGAs can be reprogrammed to desired requirements after manufacturing.

Recently, FPGAs and other hardware-based accelerators have made inroads into the cloud computing space. One emerging model is the FPGA-as-a-service model, in which a public cloud service provider makes one or more FPGAs available for use by third-party users. In such cloud deployments, FPGAs may have access to privileged (or trusted) system resources, such as processors, network interfaces, memory, and other devices. However, users of the public cloud may not be trusted, creating significant security risks in the cloud platform. Therefore, security mechanisms are needed to allow untrusted users to utilize cloud-based FPGAs in a secure manner. Furthermore, any such security mechanisms should be capable of validation and audit to ensure the overall security of the cloud-based system.

BRIEF DESCRIPTION OF THE DRAWINGS

FIGS. 3A, 3B, 3C, and 3D illustrate embodiments of a system.

DETAILED DESCRIPTION

Figure 1:
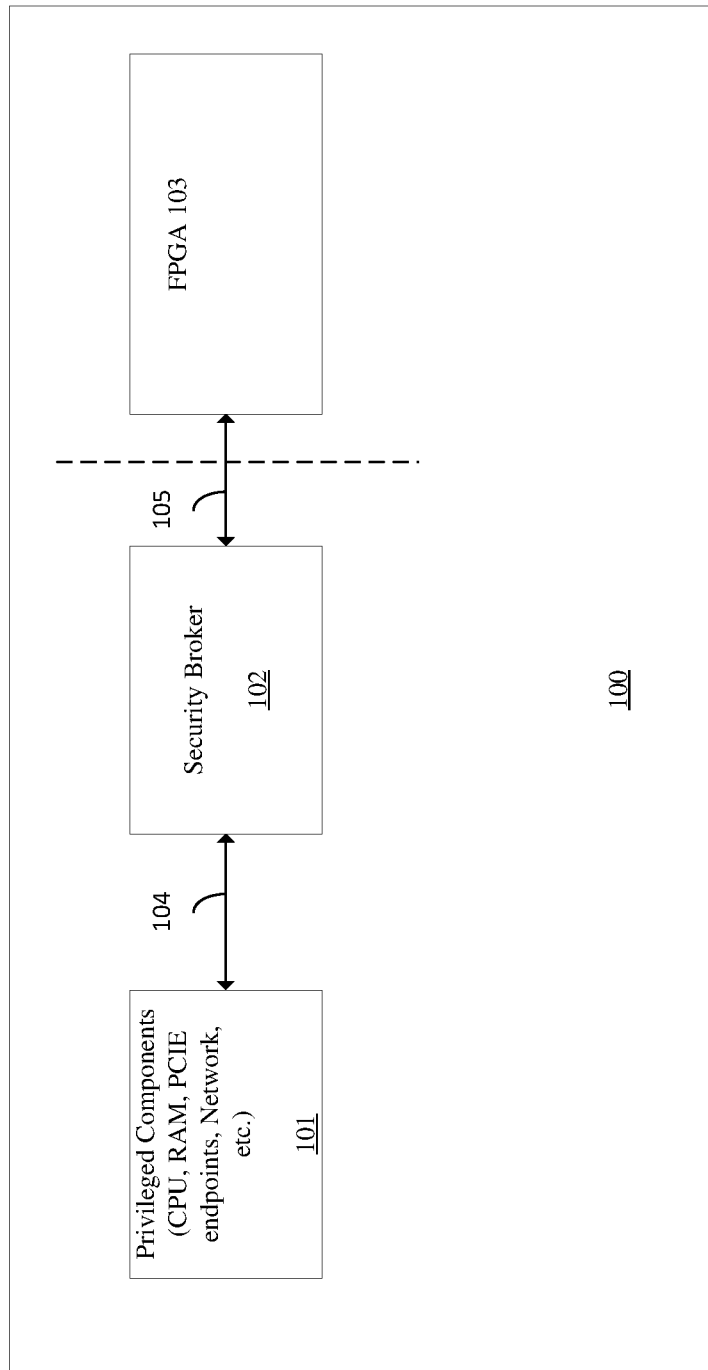
FIG. 1 illustrates an embodiment of a system.

Various embodiments may generally be directed to securely exposing an accelerator, such as an FPGA-based accelerator, to privileged system components, such as processors, memory, network connections, and storage devices. When provided in a cloud computing environment, one or more untrusted third-parties may configure the FPGA-based accelerator to perform untrusted computing operations. However, doing so introduces significant security risks. For example, an untrusted third-party may bypass conventional security mechanisms in the FPGA to access sensitive data, corrupt the system, or otherwise engage in malicious activity. Advantageously, however, embodiments disclosed herein provide a security broker that manages transactions between an FPGA-based accelerator and privileged system resources. Doing so enhances system security by restricting operations performed by the FPGA-based accelerator (also referred to herein as an "FPGA", "FPGA accelerator", or "hardware accelerator"). The use of FPGA-based accelerators as a reference example of a hardware accelerator herein should not be considered limiting of the disclosure, as the disclosure is equally applicable to other types of hardware accelerators.

The security broker disclosed herein may be physically and/or architecturally separated from the FPGA in various configurations. In embodiments, the security broker is not implemented in the FPGA fabric. In an embodiment, the security broker is implemented as a separate application specific integrated circuit (ASIC) in a multi-chip package that includes the FPGA. In an embodiment, the security broker is implemented as an ASIC chip separate from the FPGA-based accelerator. In an embodiment, the security broker is implemented as a second FPGA that is separate from the FPGA fabric of the FPGA-based accelerator. In an embodiment, the security broker is implemented as a hard block on a monolithic FPGA die. By decoupling the security broker from the FPGA fabric, embodiments may optionally power down the FPGA fabric when the FPGA fabric is not in use while allowing the security broker to continue operating.

The security broker further provides well-defined interfaces between the FPGA and privileged system components that can be validated as secure. The interfaces provided by the security broker expose the minimal set of interfaces and functionality to the FPGA, thereby limiting the amount of access the FPGA has to the rest of the system. Example security functions provided by the security broker interfaces include, without limitation, protocol correctness validation, protocol response synthesis, memory address range permission checks, management of privileged interface bandwidth used by the FPGA, thermal management, power management, and network firewall filtering.

The security broker may further include software components. The software components may generally include software for reporting security breaches and/or breach attempts, software for containing detected security breaches, software for containing detected breach attempts, and software for generally managing the security broker. For example, the security broker software may return the system to known safe state by removing the untrusted FPGA configuration that caused a security breach (and/or attempted a security breach), and clearing any relevant containment features imposed by the security broker. Additionally and/or alternatively, the security broker software may generate an entry in a system log reflecting detected breaches and/or attempted breaches. Additionally and/or alternatively, the security broker may include software which reports security breaches and attempted security breaches to higher-level management software. Additionally and/or alternatively, the security broker software may include event application programming interfaces (APIs)

that are triggered when the security broker identifies a breach and/or attempted breach. Such APIs may facilitate the implementation of higher-level security policies. Additionally and/or alternatively, the security broker software may cause the security broker to enter a containment mode and cause the FPGA fabric to enter a lower power state (e.g., via clock gating, power gating, etc.). Additionally and/or alternatively, the security broker software may cause the FPGA fabric to enter an active state, clearing any relevant state applied by the security broker and restoring the FPGA to a usable state.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatuses may be specially constructed for the required purpose or may include a general-purpose computer. The required structure for a variety of these machines will be apparent from the description given.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modification, equivalents, and alternatives within the scope of the claims.

FIG. 1 illustrates an embodiment of a computing system 100. The computing system 100 is representative of any type of computing system, and includes one or more privileged components 101, a security broker 102, and one or more FPGA accelerators 103. The privileged components 101 are representative of any type of computing resource, such as processors (CPUs), memory, system baseboard management control (BMC), Peripheral Component Interconnect Express® (PCIe) devices (e.g., network interface cards, storage devices, graphics processors (GPUs)), power, thermal output, storage devices, an FPGA, and data. The security broker 102 is logic, at least a portion of which is in hardware, that decouples the FPGA 103 from the privileged components 101. The FPGA 103 is an FPGA-based hardware accelerator. The FPGA 103 may be used for any type of processing function, such as encryption, decryption, image processing, networking functions, and the like. Because untrusted third parties can configure the FPGA 103 for custom processing, the FPGA 103 is untrusted from the perspective of an owner and/or operator of the system 100. As previously stated, the FPGA 103 is representative of any type of hardware accelerator.

In embodiments, the system 100 is part of a cloud computing environment, which provides ubiquitous access to shared pools of configurable system resources and higher-level services that can be rapidly provisioned with minimal management effort. Therefore, any number of third-party users accessing the system 100 may use the FPGA 103. Although one FPGA 103 is depicted in the system 100, the system 100 may include any number and type of FPGAs 103. For example, a first third-party user may configure encryption functions on a first FPGA 103 provided by the cloud provider, while a second third-party user may configure signal processing on a second FPGA 103 provided by the cloud provider. In such embodiments, the second FPGA 103 is a privileged component 102 relative to the first FPGA 103. Similarly, the first FPGA 103 is a privileged component 102 relative to the second FPGA 103. In some embodiments, two or more third-party users may concurrently use different portions of the FPGA 103. Therefore, as another example, the first third-party user may configure encryption functions on a first portion of the first FPGA 103, while the second third-party user may configure signal processing on a second portion of the FPGA 103. In such embodiments, the second portion of the FPGA 103 is a privileged component 102 relative to the first portion of the FPGA 103. Similarly, the first portion of the FPGA 103 is a privileged component 102 relative to the second portion of the FPGA 103.

An FPGA such as the FPGA 103 may have millions of configuration bits (not pictured) which control functions such as programmable routing, security, test scan chains, debug read-back features, and the like. Therefore, processing performed by FPGA 103 may introduce security risks. For example, a user of the FPGA 103 may modify the configuration bits of the FPGA 103 to bypass security features provided by the FPGA 103. As another example, a user may configure the FPGA 103 to maliciously access sensitive data stored in a privileged component 101 (e.g., system memory, a CPU, etc.). Advantageously, however, the security of the system 100 is enhanced by providing the security broker 102 to decouple (illustrated by the dashed line in FIG. 1) the FPGA 103 from the privileged system components 101.

Any number and type of implementation options are available to decouple the FPGA 103 from the system 100. For example, the security broker 102 may be a physically separate chiplet packaged together with a die that includes the FPGA 103. The chiplet may be a hardened chiplet and/or a soft chiplet. The hardened chiplet provides a defined interface to the physically separated fabric of the FPGA 103. In another embodiment, the chiplet may be a soft chiplet implemented within an architecturally separated fabric of the FPGA 103. As another example, the security broker 102 may be on the same die as the FPGA 103 but is decoupled from the fabric used to implement the FPGA 103. As another example, the security broker 102 may be implemented on a second FPGA (different than the FPGA 103). As still another example, the security broker 102 may be implemented on an independent ASIC. As another example, the security broker 102 may be implemented as part of a BMC. Furthermore, the security broker 102 may be implemented as a combination of components. One such combination includes a PCIe storage switch and an Intel Virtualization Technology for Directed I/O (VT-d) input-output memory management unit (IOMMU), while another combination includes a distributed virtual network firewall.

Regardless of the specific implementation, the FPGA 103 must access the privileged components 101 via the security broker 102. As shown in FIG. 1, the system 100 includes a set of privileged interfaces 104 and a set of FPGA interfaces 105. The privileged interface 104 is representative of one or more interfaces between the security broker 102 and the privileged components 101. The FPGA interface 105 is representative of one or more interfaces between the security broker 102 and the FPGA 103. The trusted interfaces 104 may be any type of interface, such as a PCIe bus, system management bus (SMBUS), a network interface (e.g., Ethernet®, Omni-Path, InfiniBand®, etc.), an Intel® QuickPath Interconnect (QPI), an Intel UltraPath Interconnect (UPI), a memory interface (e.g., DDR3, DDR4, RLDRAM, 3D XPoint, etc.). The FPGA interfaces 105 may be any type of interface, such as a core cache interface (CCI-P), PCIe bus, SMBUS, network interface, QPI, UPI, memory interface, and the like.

To enhance the security of the system 100, the security broker 102 validates instructions sent by the FPGA 103 (and/or instructions sent by the privileged components 101 to the FPGA 103), and performs operations to secure the system when invalid instructions are identified. For example, if the FPGA 103 attempts to access a memory address that is outside the range of memory addresses the FPGA 103 is permitted to access, the security broker 102 may restrict the operation of the memory access and clear the FPGA 103, thereby denying access to the memory address and preserving system security. Similarly, if the FPGA 103 does not respond to a PCIe command within a predefined timeout threshold, the security broker 102 may respond to the PCIe privileged component 101 on behalf of the FPGA 103 to keep the system 100 in a stable state. As another example, a first portion of the FPGA 103 may attempt to access a second portion of the FPGA 103. In such an example, the security broker 102 may determine that the first portion of the FPGA 103 (and/or the associated third-party entity) is restricted from accessing the second portion of the FPGA 103, and restrict the attempted access by the first portion of the FPGA 103 to the second portion of the FPGA 103.

Figure 2:
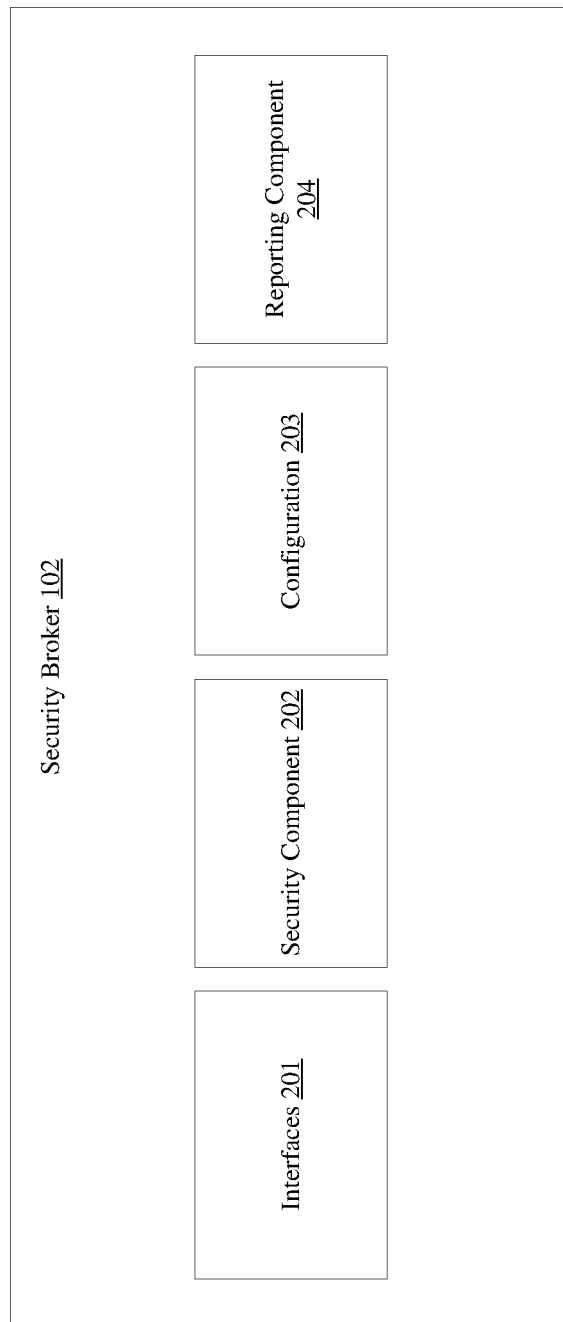
FIG. 2 illustrates an embodiment of a security broker.

FIG. 2 illustrates a more detailed view of components of the security broker 102 according to an embodiment. In the depicted embodiment, the security broker 102 includes interfaces 201, a security component 202, a configuration 203, and a reporting component 204. The interfaces 201 are representative of any type of interface, including at least the privileged interfaces 104 and the FPGA interfaces 105 of FIG. 1. The security component 202 is logic configured to perform security functions within the system 100. The security component 202 may be implemented as hardware, software, and/or a combination thereof. The security component 202 may perform any type of security function that ensures the FPGA 103 is executing properly. For example, the security component 202 may perform protocol correctness validation and/or protocol synthesis. One such example includes detecting non-compliance with a given protocol (e.g., the PCIe protocol). If the FPGA 103 (and/or executing code thereon) issues one or more instructions that do not comply with the protocol, the security component 202 may filter the non-compliant instructions such that these instructions are not able to corrupt the rest of the system 100 (e.g., the privileged components 101). As another example, if the FPGA 103 does not respond to an instruction from a privileged component 101 according to a corresponding protocol (e.g., the PCIe completion timeout), the security component 202 may generate and transmit the appropriate response on behalf of the FPGA 103. As another example, the security component 202 may detect when the FPGA 103 engages in PCIe Bus:Device:Function (BDF) spoofing, and secure the system 100 in response. Generally, spoofing involves specifying an incorrect PCIe BDF in generated instructions, which could lead to security issues. Although PCIe is used as a reference example herein, the disclosure is equally applicable to other devices and/or protocols (e.g., Cache Coherent Interconnect for Accelerators (CCIX®), NVLink®, Gen-Z®, UltraPath Interconnect (UPI)).

The security component 202 may further provide host memory address range permission checks. For example, the security component 202 may include a memory management unit (MMU) which manages ranges of memory addresses the FPGA 103 may access. If the FPGA 103 attempts to access a memory address outside of the permitted range, the security component 202 may restrict access to the requested memory address. The security component 202 may further implement private shared memory address range permission checking via the MMU, ensuring the FPGA 103 are limited to accessing specified ranges of private shared memory, and excluding the FPGA 103 from other ranges of the private shared memory. The security component 202 may further provide bandwidth utilization allocation, tracking and throttling via the interfaces 201. For example, the security component 202 may limit the FPGA 103 to a 1 megabit/second bandwidth utilization threshold over a privileged interface 104. If, based on bandwidth monitoring, the security component 202 determines that the FPGA 103 exceeds the 1 megabit/s threshold over the privileged interface 104, the security component 202 may throttle the bandwidth used by the FPGA 103 over the privileged interface 104 to reduce the used bandwidth to below the threshold.

As another example, the security component 202 may provide thermal tracking and throttling. For example, malicious users may attempt to damage the system 100 by overheating the FPGA 103 via excessive processing. The security component 202 may monitor the temperature values provided by different temperature sensors in the system 100 (e.g., temperature sensors on the security broker 102 die, proxy temperature sensors on the FPGA 103, etc.) to determine when a thermal threshold limit is exceeded, and throttle the FPGA 103. The security component 202 may further provide power tracking and throttling to ensure that the FPGA 103 does not exceed power thresholds. For example, the security component 202 may receive energy current use values from a voltage regulator of the system 100 (not pictured). If the received values exceed a corresponding energy current threshold, the security component 202 may throttle the FPGA 103 to lower energy consumption below the threshold. As another example, the security component 202 may apply network firewall filtering to data transmitted to or from the FPGA 103. As yet another example, the security component 202 may perform interrupt remapping within the system 100 and/or throttle interrupts generated from the FPGA 103. As another example, the security component 202 may apply virtual domain restrictions using Process Address Space ID (PASID) and/or BDF.

The configuration 203 is representative configuration parameters for the security broker 102. Example configuration 203 parameters include, without limitation, rules, protocol requirements, known good system states, formatting requirements, bandwidth thresholds, instruction thresholds, timeout values, memory range permissions, permitted destinations, power thresholds, thermal thresholds, applicable system management operations, and the like. Furthermore, the configuration 203 may specify features that isolate two or more concurrent configurations of the same FPGA 103 by different third parties in a cloud environment. For example, the configuration 203 may include features to ensure that a first third-party configuration of a portion of a given FPGA 103 (e.g., a portion configured by the first third party to perform encryption operations) is isolated from a second third-party configuration of a different portion of the same FPGA 103 (e.g., a portion configured by the second third party to perform signal processing operations). The configuration 203 may be implemented as hardware, software, or a combination thereof.

The reporting component 204 includes software and/or hardware for managing the security broker 102, managing the FPGA 103, and reporting attempted and/or actual security breaches. For example, if the security broker 102 restricts the FPGA 103 from accessing a privileged component 101, the reporting component 204 reference the configuration 103 to determine a set of associated system management operations to restore the system 100 to a secure operating state. For example, the reporting component 204 may return the system 100 to a last known good state (e.g., using state information stored in the configuration 203), halt execution of the FPGA 103, remove the FPGA 103 from the system 100 using software and/or hardware generated instructions, and clear any additional features applied by the security broker 102. Additionally and/or alternatively, the reporting component 204 may create an entry in a log (not pictured) that reflects the detected security breach.

Additionally and/or alternatively, the reporting component 204 may report the security breach to other components of the system 100 (e.g., management software). Additionally and/or alternatively, the reporting component 204 may further include APIs that trigger when specific types of security incidents are detected, allowing higher-level policies to be built. Additionally and/or alternatively, the reporting component 204 may trigger the security broker 102 into a containment mode and cause the FPGA 103 to enter a lower power state (e.g., by power gating, clock gating, etc.). Additionally and/or alternatively, the reporting component 204 may cause the FPGA 103 fabric to enter an active state, clear the containment mode from the security broker 102, and restore the FPGA 103 to full usability.

FIG. 3A illustrates an embodiment of the system 100 including the privileged components 101, the security broker 102, and the FPGA 103. The security broker 102 physically and architecturally separates the FPGA 103 from the privileged components 101. In FIG. 3A, the security broker 102 may be implemented as a hardened chiplet, a PCIe storage switch with custom filtering firmware, and the like. In the depicted embodiment, the security broker 102 does not allow the FPGA 103 to initiate transactions with the privileged components 101. Therefore, in such embodiments, the FPGA 103 cannot act as a master, further enhancing system security. Instead, transactions are initiated by the privileged components 101, and the FPGA 103 is only permitted to respond to such transactions. For example, the security broker 102 may receive a request from the CPU targeting the FPGA 103 via the interface 201-1, and forward request to the FPGA 103 via the interface 201-2. The FPGA 103 may then generate a response to the request to complete the transaction. The FPGA 103 may forward the response to the security broker 102 via, which determines the response is valid. The security broker 102 may then forward the response to the CPU. However, if the FPGA 103 initiates a transaction (e.g., as a PCIe master) targeting the CPU, the security broker 102 may filter (or drop) the request, and trigger the reporting component 104 to perform additional security operations.

Figure 3B:
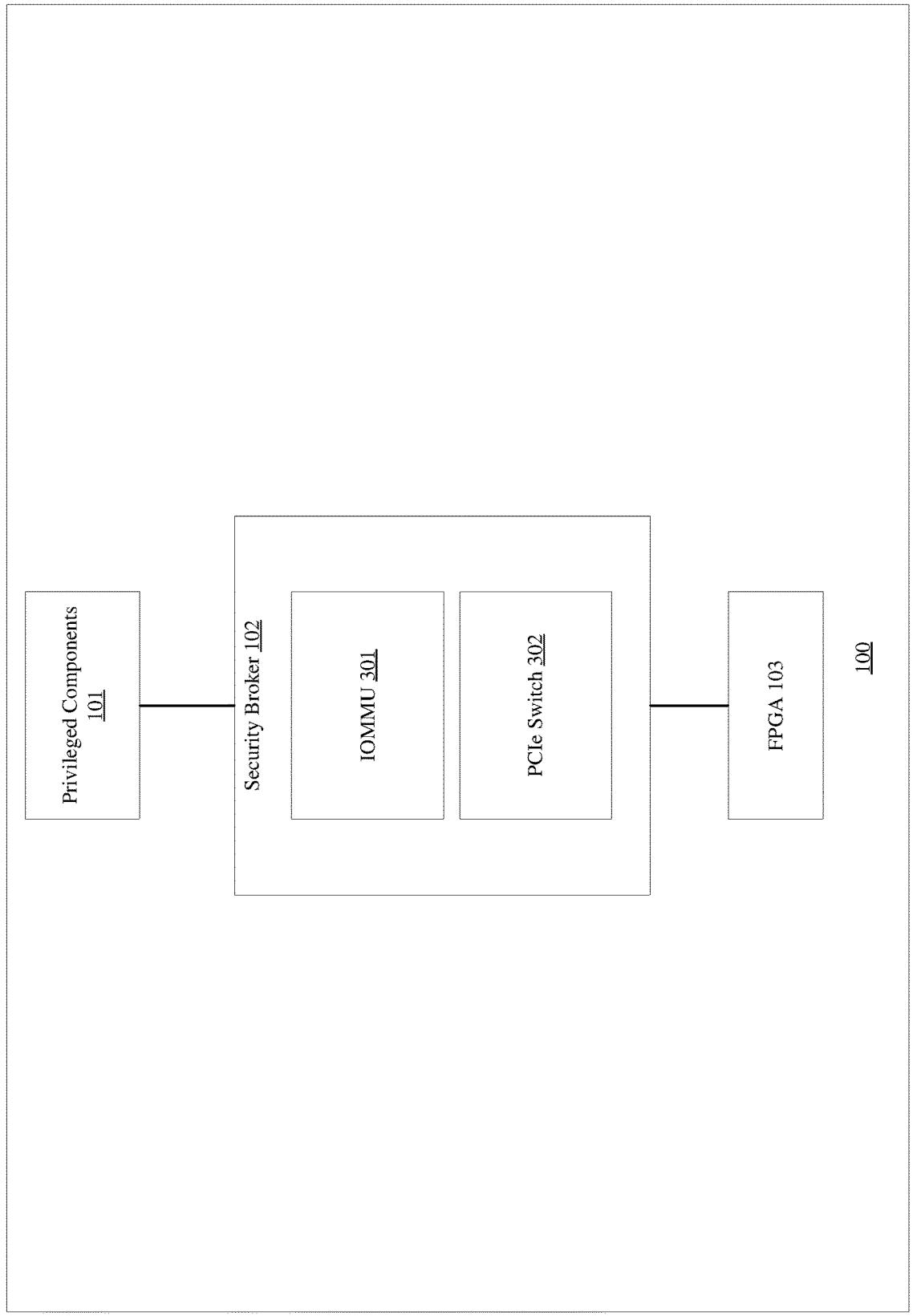

FIG. 3B depicts an embodiment of the system 100 including the privileged components 101, the security broker 102, and the FPGA 103. More specifically, FIG. 3B depicts an embodiment where the security broker 102 includes an IOMMU 301 and PCIe storage switch 302. The IOMMU 301 may generally provide at least a portion of the memory management operations described above with reference to the security component 202. For example, if the FPGA 103 attempts to access a memory address, the IOMMU 301 determines whether the FPGA 103 is permitted to access the memory address. If the FPGA 103 is not permitted to access the memory address, the IOMMU 301 (and/or another designated component of the security broker 102) may block (or filter, or drop) the attempt to access the memory address. Otherwise, if the memory address is within a range of permitted addresses, the IOMMU 301 (and/or another designated component of the security broker 102) may forward the request to access the memory address. The IOMMU 301 may further provide interrupt remapping functions. The PCIe storage switch 302 may process PCIe transactions in the system, ensuring that the FPGA 103 complies with the PCIe protocol, and detecting attempts by the FPGA 103 to falsify the PCIe BDF associated with the FPGA 103. The PCIe storage switch 302 may further provide PCIe endpoint containment, I/O virtual address filtering, and synthesize PCIe responses on behalf of a non-responsive FPGA 103.

Figure 3C:
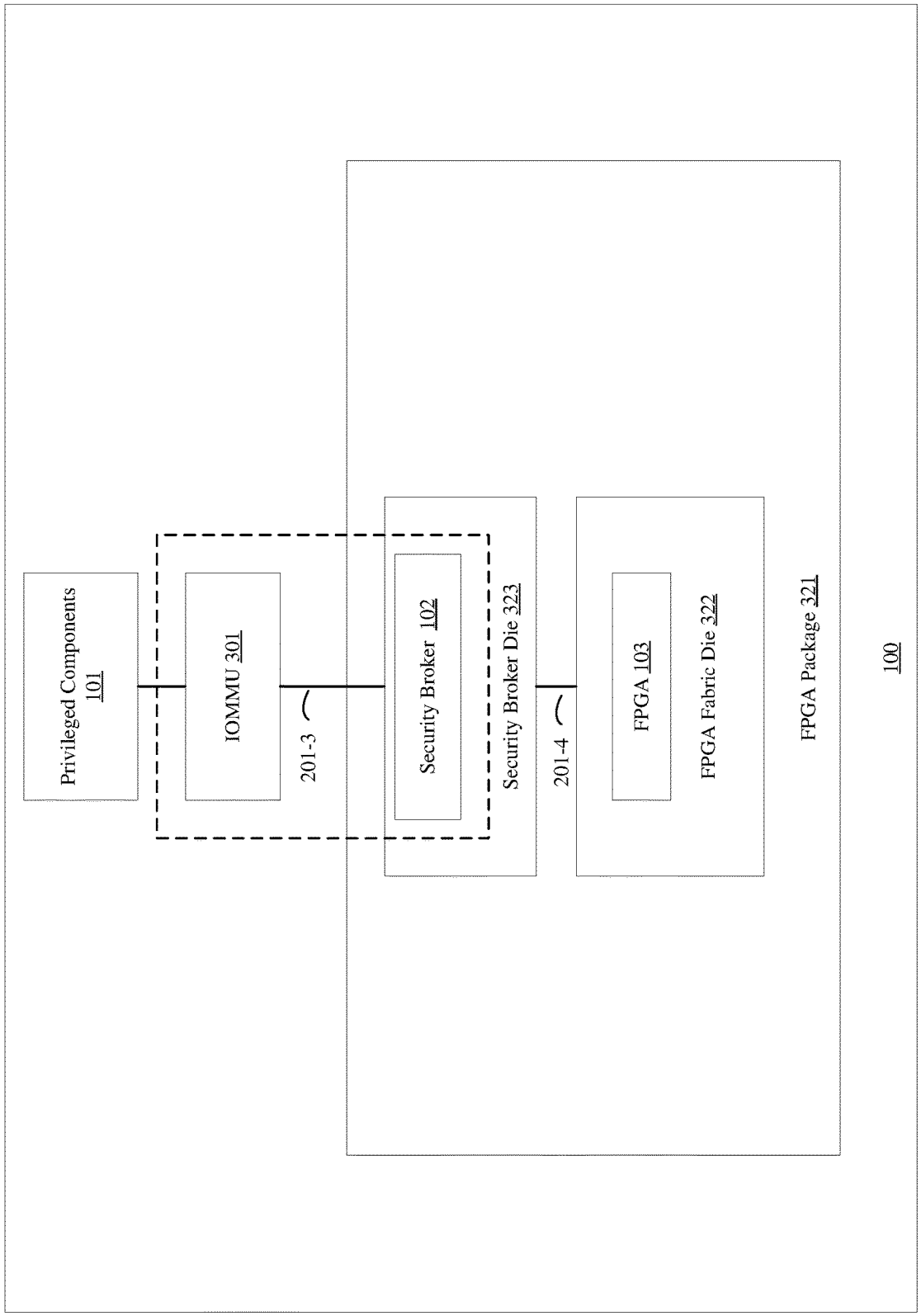

FIG. 3C depicts an embodiment of the system 100 including the privileged components 101, the security broker 102, and the FPGA 103. As shown, the system 100 in FIG. 3C further includes an FPGA package 321 and the IOMMU 301. As stated above, the IOMMU performs memory range permission validation and interrupt remapping. The FPGA package 321 includes an FPGA fabric die 322 and a security broker die 323 communicably coupled by an interface 201-4. A die, in the context of integrated circuits, is a block of semiconducting material on which a functional circuit is fabricated. Therefore, as shown, the FPGA fabric die 322 includes the FPGA 103, while the security broker die 323 includes the security broker 102. In an embodiment, the interface 201-4 is a CCI-P interface. The security broker die 323 is connected to the IOMMU 301 via the interface 201-3, which, in an embodiment, is a PCIe interface. The architecture of the security broker 102 includes the IOMMU 301, illustrated by the dashed box in FIG. 3C.

Figure 3D:
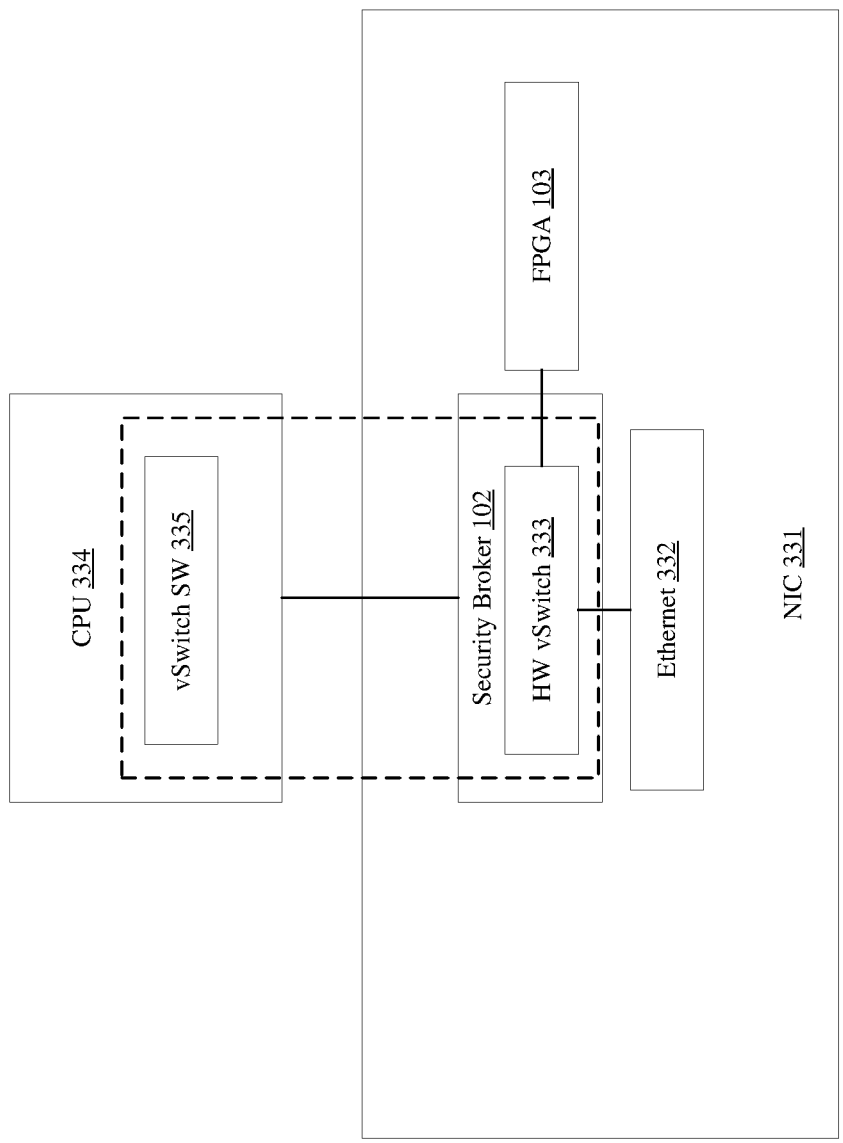

FIG. 3D depicts an embodiment of the system 100 configured to perform networking functions. The system 100 of FIG. 3D includes a network interface card (NIC) 334 and a CPU 334 (e.g., a privileged component 101). The NIC 334 includes the security broker 102, the FPGA 103, and an Ethernet interface 332 (e.g., an Ethernet port). The security broker 102 includes a hardware virtual switch (HW vSwitch) 333. In one embodiment, the HW vSwitch is an Open vSwitch®. The CPU 334 illustratively executes vSwitch software 335. Architecturally, the components of the security broker 102 include the HW vSwitch 333 and the vSwitch software 335, illustrated by the dashed line in FIG. 3D. As such, the security broker 102 provides network firewall functionality. For example, if the FPGA 103 attempts to access restricted network locations, the security broker 102 may block the attempted access by the FPGA 103.

Figure 4A:
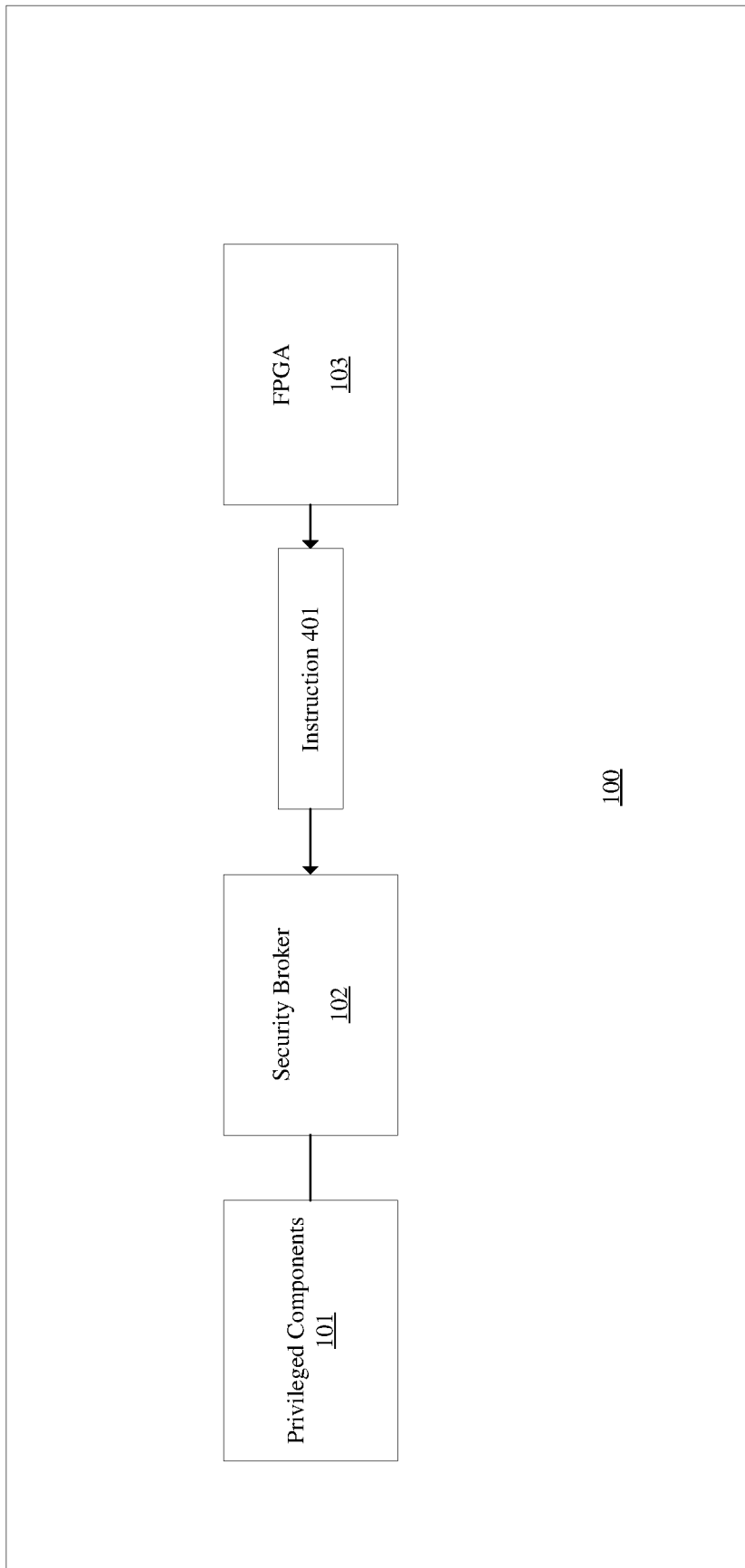
FIGS. 4A, 4B, and 4C illustrate embodiments of securing a system.

FIG. 4A illustrates an embodiment of securing the system 100. As shown, the FPGA 103 issues an instruction 401 to the security broker 102. While a single instruction 401 is depicted, the instruction 401 is representative of any number and type of instructions and/or computing operations. Once received, the security broker 102 analyzes the instruction 401 to determine whether the instruction 401 is valid relative to the rules and constraints defined in the system 100 (e.g., the configuration 203). For example, if the instruction 401 is representative of a PCIe command, the security broker 102 determines whether the instruction 401 conforms with the PCIe protocol and any additional requirements specified by the configuration 203.

Figure 4B:
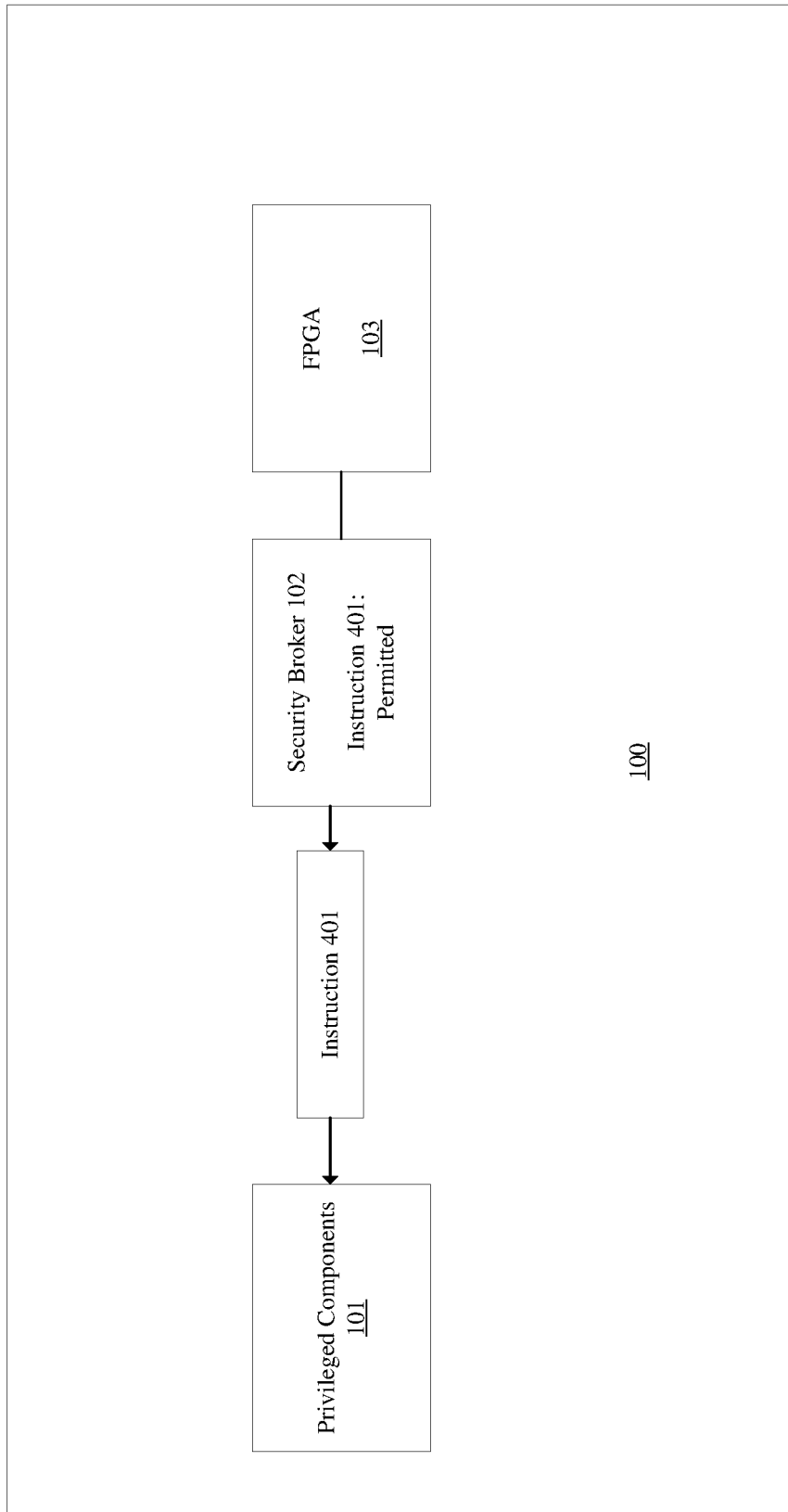

FIG. 4B depicts an embodiment where the security broker 102 has validated the instruction 401. Once validated, the security broker 102 forwards the instruction 401 via one of the trusted interfaces to the target privileged component 101 for further processing.

Figure 4C:
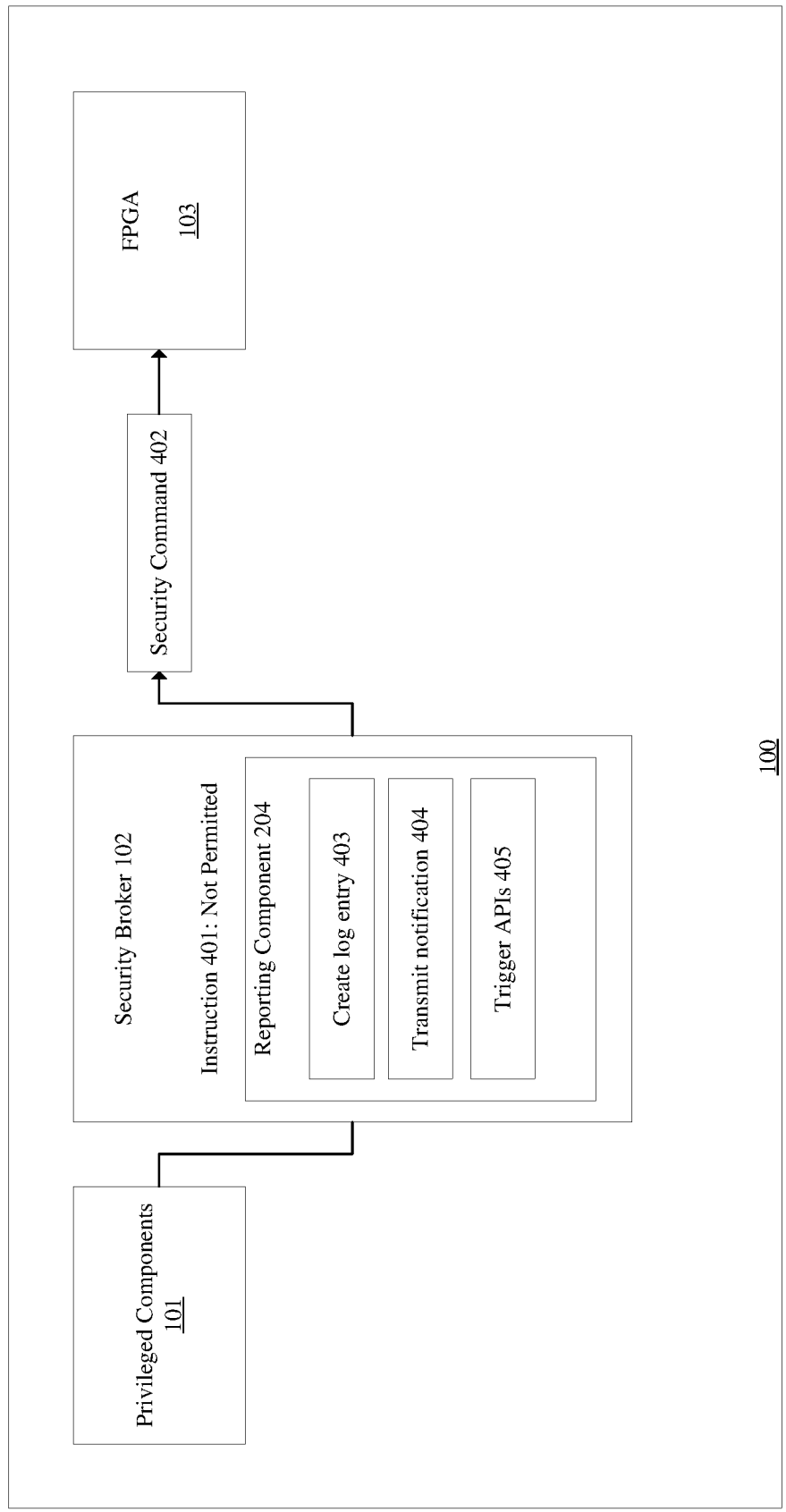

FIG. 4C, however, depicts an embodiment where the security broker 102 has determined that the instruction 401 is not valid. In FIG. 4C, the security broker 102 may drop the instruction 401 (or otherwise prevent forwarding and/or further processing of the instruction 401). The security broker 102 and/or the reporting component 204 may further generate a security command 402 which is sent to the FPGA 103. The security command 402 may generally include any number of commands configured to control the FPGA 103, e.g., by powering off the FPGA 103, removing the FPGA 103 from the system 100, halting further processing by the FPGA 103, and so on. Furthermore, the reporting component 204 may perform functions 403-405. Illustratively, reporting component 204 may create a log entry reflecting the invalid instruction 401 in a system log at block 403. The reporting component 204 may further generate and transmit a notification reporting the invalid instruction 401 at block 404. The notification may be transmitted to other system management components (e.g., the BMC). At block 405, the reporting component 204 may trigger one or more APIs to facilitate further security features provided by the system 100.

Figure 5:
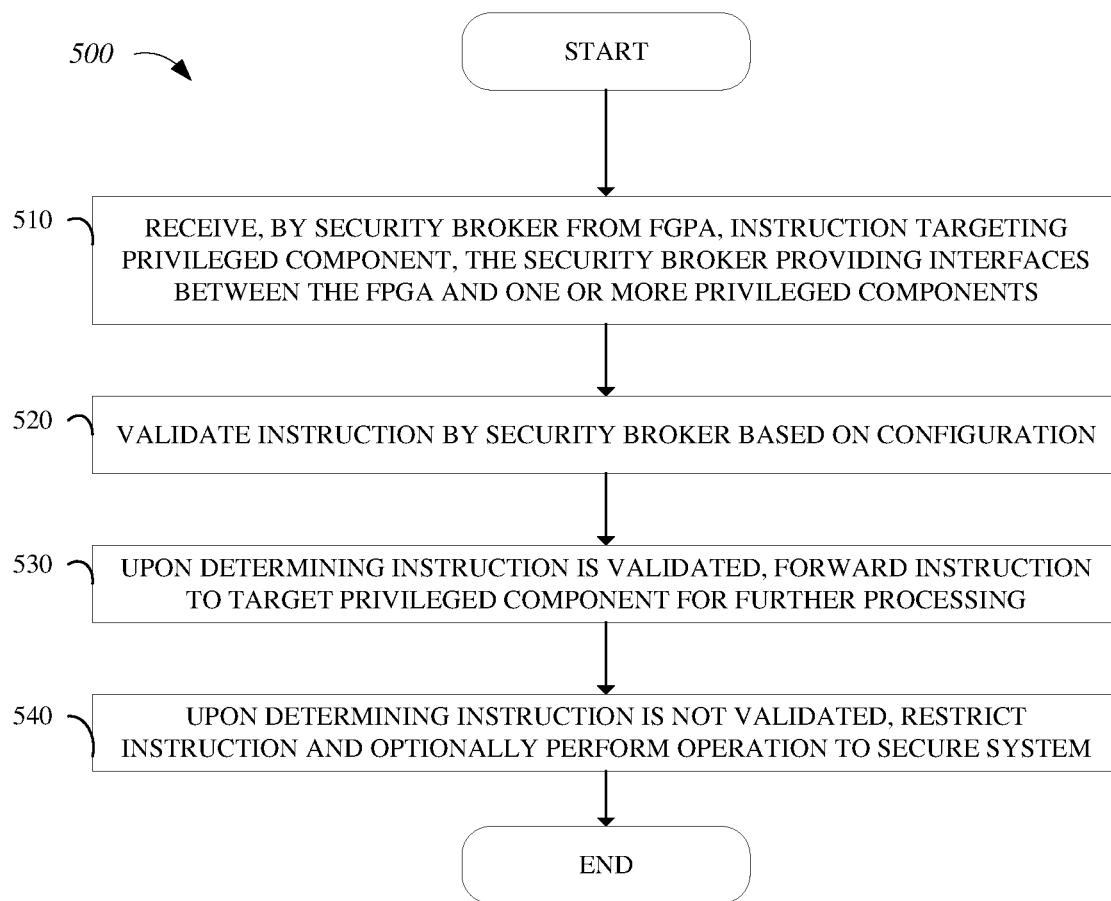
FIG. 5 illustrates an embodiment of a first logic flow.

FIG. 5 illustrates an embodiment of a logic flow 500. The logic flow 500 may be representative of some or all of the operations executed by one or more embodiments described herein. Embodiments are not limited in this context.

In the illustrated embodiment shown in FIG. 5, the logic flow 500 may begin at block 510. At block 510 "receive, by security broker from FPGA, instruction targeting privileged component, the security broker providing interfaces between the FPGA component and one or more privileged components", the security broker 102 may receive an instruction from the FPGA 103 that targets a privileged component 101 of the system 100. For example, the instruction may specify to access data stored at a first memory address. However, the instruction may be any type of instruction generated by the FPGA 103. At block 520 "validate instruction by security broker based on configuration," the security broker 102 attempts to validate the instruction received at block 510 based on the configuration 203. For example, the security broker 102 may determine whether the first memory address is within a range of memory addresses the FPGA 103 is permitted to access.

At block 530, "upon determining instruction is valid, forward instruction to target privileged component for further processing", the security broker 102 validates the instruction and forwards the instruction to the target privileged component 101 for further processing. For example, the security broker 102 may determine at block 530 that the first memory address is within a range of memory addresses the FPGA 103 is permitted to access. Therefore, the security broker 102 may forward the instruction to the target memory device in the system 100, where the data at the first memory address can be read and returned to the FPGA 103.

At block 540, "upon determining instruction is not validated, restrict instruction and optionally perform operation to secure system", the security broker 102 determines the instruction was not validated at block 520 (e.g., is an invalid instruction), restricts the instruction, and optionally performs an operation to secure the system 100. For example, if security broker 102 determines that the first memory address is not within the range of memory addresses the FPGA 103 is permitted to access, the security broker 102 may drop, filter, or otherwise restrict the instruction. Doing so prevents further processing of the instruction within the system 100, and ensures that the FPGA 103 does not receive the data at the first memory address. The security broker 102 may optionally perform additional operations in response to the invalidated instruction, such as powering off the FPGA 103, clearing the FPGA 103, alerting an administrator, etc.

Figure 6:
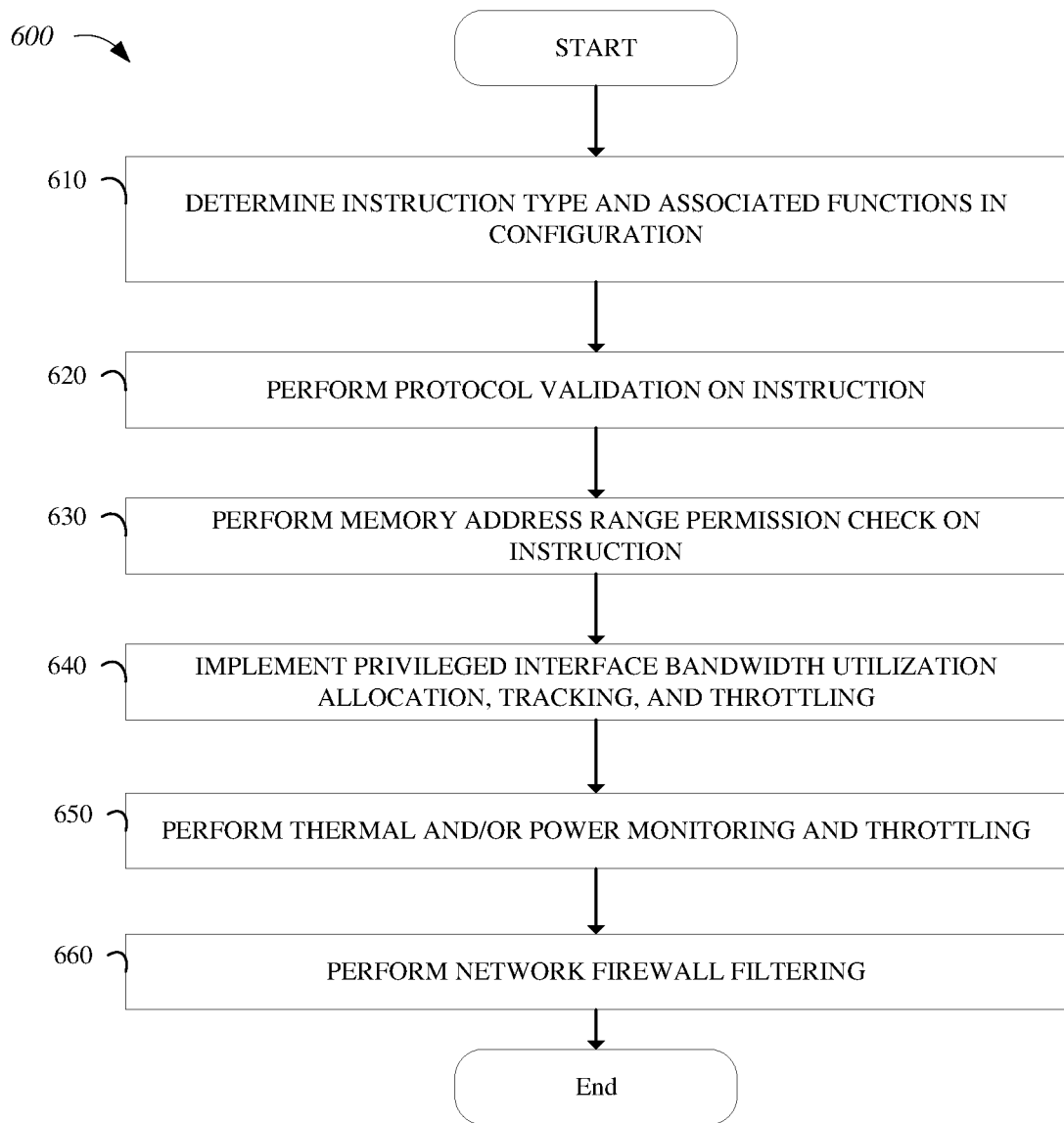
FIG. 6 illustrates an embodiment of a second logic flow.

FIG. 6 illustrates an embodiment of a logic flow 600. The logic flow 600 may be representative of some or all of the operations executed by one or more embodiments described herein. For example, the security broker 102 may implement one or more of the operations described in the logic flow 600. Embodiments are not limited in this context.

In the illustrated embodiment shown in FIG. 6, the logic flow 600 may begin at block 610. At block 610 "determine instruction type and associated functions in configuration", the security broker 102 determines a type of instruction received from the FPGA 103 (and/or a privileged component 101) by analyzing the instruction, and determines any associated functions in the configuration 203. For example, the memory instruction received at block 510 may be associated with memory management functions (e.g., memory permissions checks) in the configuration 203. However, any number and types of functions, protocols, thresholds, and operations may be specified in the configuration 203.

At block 620 "perform protocol validation on instruction", the security broker 102 optionally performs protocol validation on an instruction to determine whether the instruction complies with a corresponding protocol. If the instruction does not comply with the protocol, the security broker 102 may determine that the instruction is invalid. If the instruction complies with the protocol, the security broker may validate the instruction. At block 630 "perform memory address range permission check on instruction" the security broker 102 optionally performs memory address range permission checks on an instruction specifying to access a memory address to determine whether the FPGA 103 is permitted to access the memory address. Doing so allows the security broker 102 to validate the instruction (if within the permitted range of memory addresses) or invalidate the instruction (if not within the permitted range of memory addresses).

At block 640 "implement privileged interface bandwidth utilization allocation, tracking, and/or throttling", the security broker 102 optionally implements bandwidth utilization, tracking, and throttling on the privileged interfaces 104 (and/or the interfaces 105) by the FPGA 103. For example, the FPGA 103 may be allocated a threshold amount of bandwidth over the privileged interfaces 104. The security broker 102 may monitor the amount of bandwidth used by the FPGA 103 over the privileged interfaces. Upon determining the used bandwidth exceeds the threshold, the security broker 102 may throttle the FPGA 103 to reduce the amount of used bandwidth, such that the amount of used bandwidth is lower than the threshold.

At block 650 "perform thermal and/or power monitoring and throttling", the security broker 102 performs monitoring of the amount of thermal energy generated by the FPGA 103 and/or power used by the FPGA 103. If the amount of thermal energy generated by the FPGA 103 exceeds a thermal energy threshold, the security broker 102 may operate to reduce the amount of thermal energy generated by the FPGA 103 (e.g., throttling the FPGA 103, powering off the FPGA 103, etc.). Additionally and/or alternatively, if the amount of energy used by the FPGA 103 exceeds a power threshold, the security broker 102 may perform an operation to reduce the amount of energy used by the FPGA 103 (e.g., throttling the FPGA 103, powering off the FPGA 103, etc.). At block 660 "perform network firewall filtering", the security broker 102 optionally performs network firewall filtering to limit network destinations that the FPGA 103 can access (e.g., based on a routing table specifying permitted and restricted network addresses).

Figure 7:
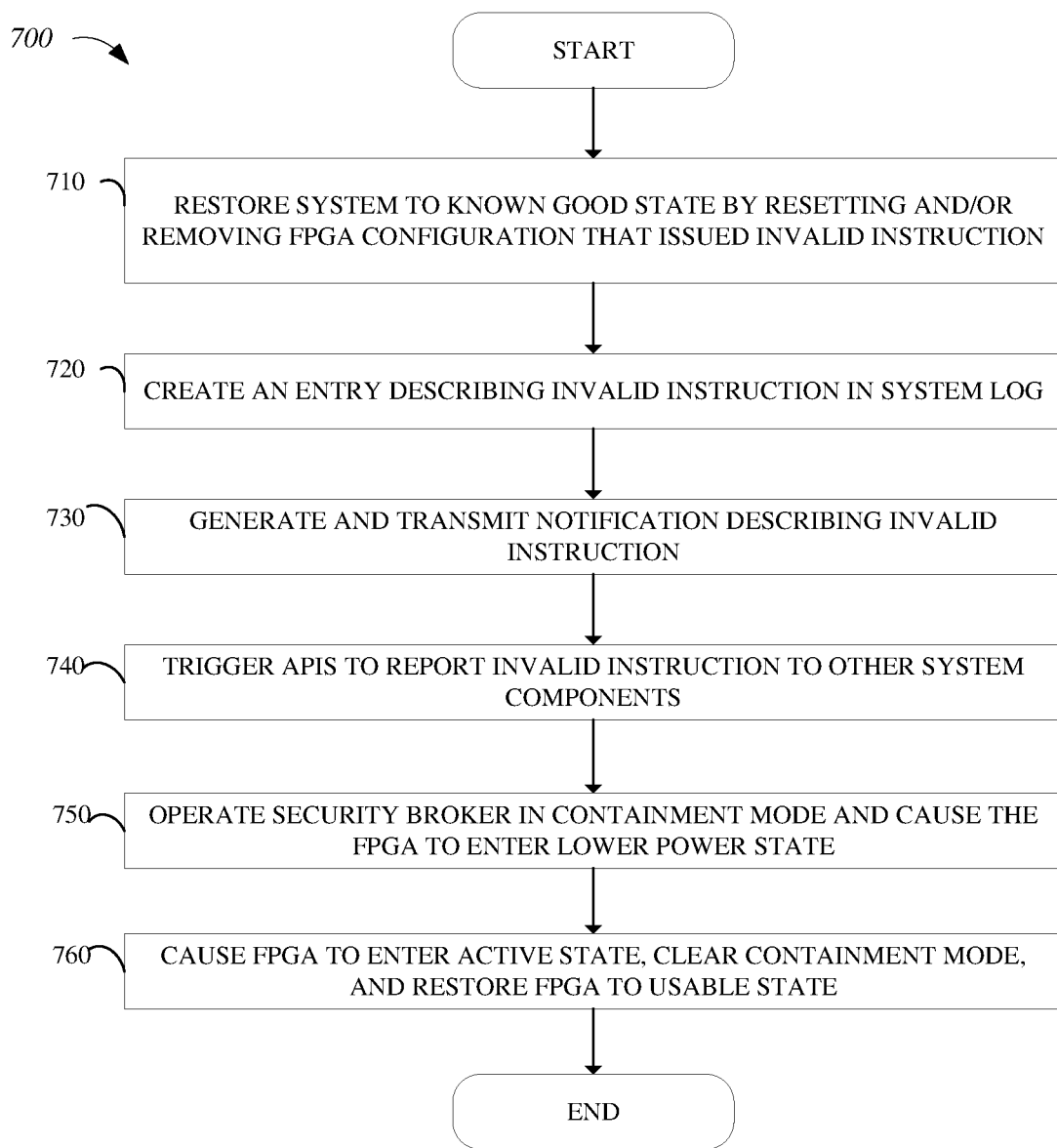
FIG. 7 illustrates an embodiment of a third logic flow.

FIG. 7 illustrates an embodiment of a logic flow 700. The logic flow 700 may be representative of some or all of the operations executed by one or more embodiments described herein. For example, the security broker 102 may implement one or more of the operations described in the logic flow 700. Embodiments are not limited in this context.

In the illustrated embodiment shown in FIG. 7, the logic flow 500 may begin at block 710. At block 710 "restore system to known good state by resetting and/or removing FPGA configuration that issued invalid instruction", the security broker 102 restores the system 100 to a known good state by removing the FPGA 103 configuration that issued an invalid instruction, e.g., by resetting the FPGA 103 and/or clearing the current configuration of at least a portion of the FPGA 103. At block 720 "create an entry describing invalid instruction in system log", the security broker 102 optionally creates an entry in a system log describing an invalid instruction. The entry in the system log may specify indications of the user of the FPGA 103, the invalid instruction, a reason why the instruction was invalidated, a target privileged component 101, and any other attribute of the invalid instruction.

At block 730, "generate and transmit notification describing invalid instruction", the security broker 102 generates and transmits a notification (e.g., to the BMC, a system management component, etc.) describing the invalid instruction. At block 740 "trigger APIs to report invalid instruction to other system components", the security broker 102 triggers one or more APIs which report the invalid instruction to other system components as described in greater detail above. At block 750 "operate security broker in containment mode and cause the FPGA to enter lower power state", the security broker 102 enters containment mode that restricts the FPGA 103 from performing any functions, and causes the FPGA 103 to enter a lower power state (e.g., when the FPGA 103 attempts to perform an invalid operation). At block 760 "cause FPGA to enter active state, clear containment mode, and restore FPGA to usable state", the security broker 102 clears the containment mode, causes the FPGA 103 to enter an active state, thereby restoring the FPGA 103 from the containment mode and other restrictions applied at block 750.

Figure 8:
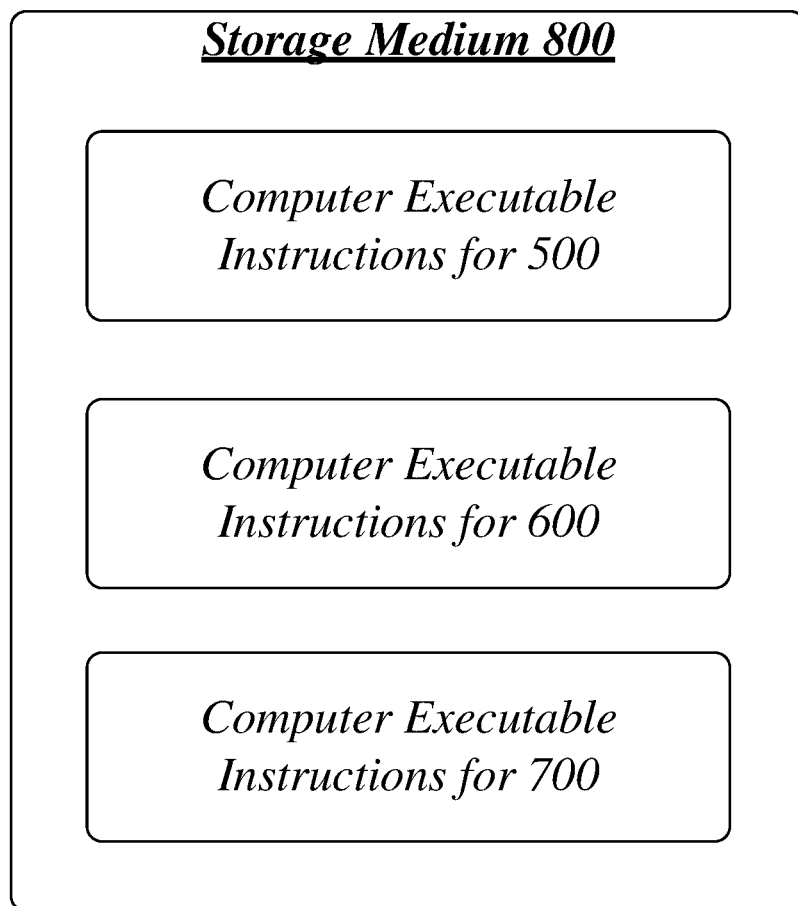
FIG. 8 illustrates an embodiment of a storage medium.

FIG. 8 illustrates an embodiment of a storage medium 800. Storage medium 800 may comprise any non-transitory computer-readable storage medium or machine-readable storage medium, such as an optical, magnetic or semiconductor storage medium. In various embodiments, storage medium 800 may comprise an article of manufacture. In some embodiments, storage medium 800 may store computer-executable instructions, such as computer-executable instructions to implement one or more of logic flows or operations described herein, such as with respect to 500, 600, and 700 of FIGS. 5-7. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 9:
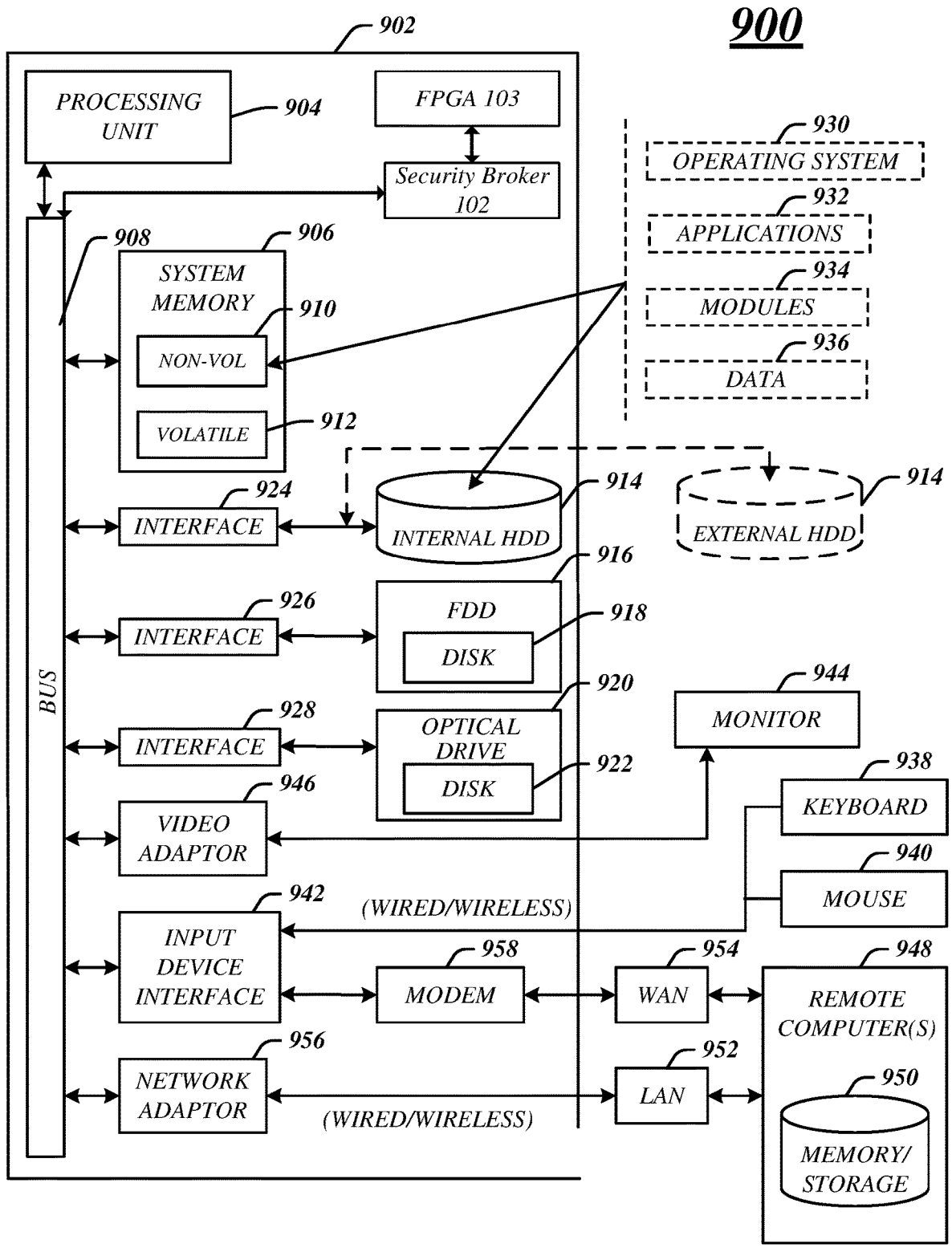
FIG. 9 illustrates an embodiment of a computing architecture.

FIG. 9 illustrates an embodiment of an exemplary computing architecture 900 that may be suitable for implementing various embodiments as previously described. In various embodiments, the computing architecture 900 may comprise or be implemented as part of an electronic device. In some embodiments, the computing architecture 900 may be representative, for example, of a server that implements one or more components of the system 100. In some embodiments, computing architecture 900 may be representative, for example, of the privileged components 101, security broker 102, and FPGA 103 of the system 100. The embodiments are not limited in this context. More generally, the computing architecture 900 is configured to implement all logic, systems, methods, apparatuses, and functionality described herein with reference to FIGS. 1-8.

As used in this application, the terms "system" and "component" and "module" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 900 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 900.

As shown in FIG. 9, the computing architecture 900 comprises a processing unit 904, a system memory 906 and a system bus 908. The processing unit 904 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multi processor architectures may also be employed as the processing unit 904.

The system bus 908 provides an interface for system components including, but not limited to, the system memory 906 to the processing unit 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computer 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 994 interface technologies. The computer 902 includes the security broker 102 and the FGPA 103 hardware accelerator, each described in greater detail above. The computer 902 is generally is configured to implement all logic, systems, methods, apparatuses, and functionality described herein with reference to FIGS. 1-8.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of the system 100.

A user can enter commands and information into the computer 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 904 through an input device interface 942 that is coupled to the system bus 908, but can be connected by other interfaces such as a parallel port, IEEE 994 serial port, a game port, a USB port, an IR interface, and so forth.

A monitor 944 or other type of display device is also connected to the system bus 908 via an interface, such as a video adaptor 946. The monitor 944 may be internal or external to the computer 902. In addition to the monitor 944, a computer typically includes other peripheral output devices, such as speakers, printers, and so forth.

The computer 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 10:
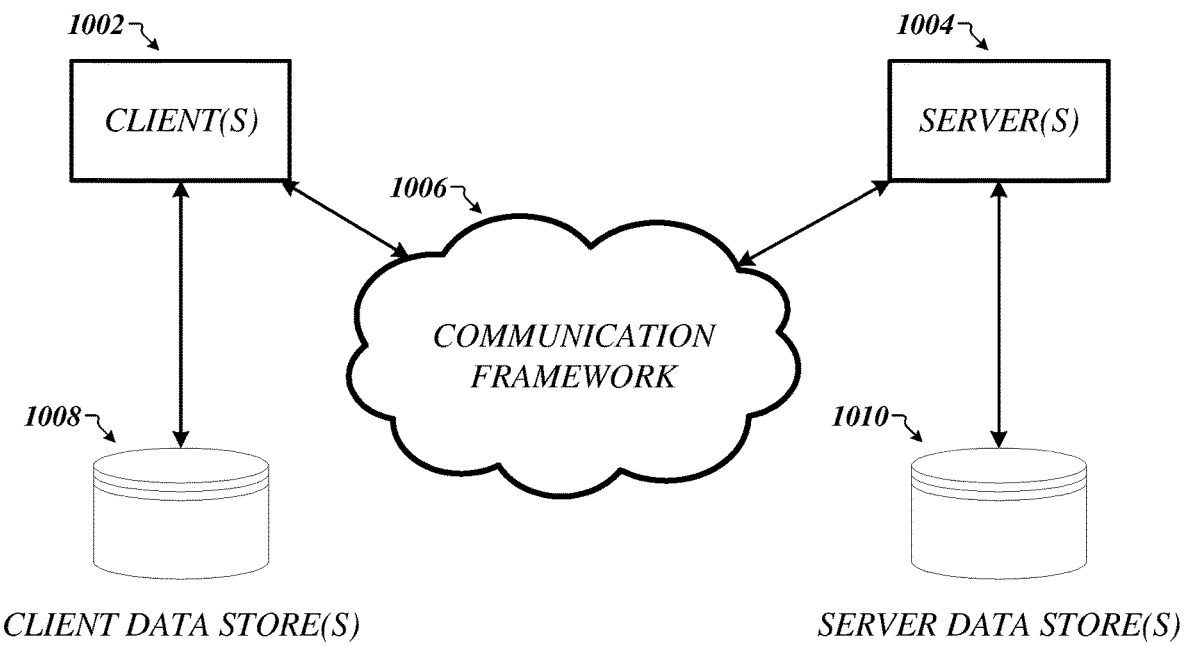
FIG. 10 illustrates an embodiment of a communications architecture.

FIG. 10 illustrates an embodiment of a communications architecture 1000 suitable for implementing various embodiments as previously described. The communications architecture 1000 includes various common communications elements, such as a transmitter, receiver, transceiver, radio, network interface, baseband processor, antenna, amplifiers, filters, power supplies, and so forth. The embodiments, however, are not limited to implementation by the communications architecture 1000.

As shown in FIG. 10, the communications architecture 1000 comprises includes one or more clients 1002 and servers 1004. The clients 1002 and the servers 1004 are operatively connected to one or more respective client data stores 1008 and server data stores 1010 that can be employed to store information local to the respective clients 1002 and servers 1004, such as cookies and/or associated contextual information. In various embodiments, any one of servers 1004 may implement one or more of logic flows or operations described herein, and storage medium 800 of FIG. 8 in conjunction with storage of data received from any one of clients 1002 on any of server data stores 1010.

The clients 1002 and the servers 1004 may communicate information between each other using a communication framework 1006. The communications framework 1006 may implement any well-known communications techniques and protocols. The communications framework 1006 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1006 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1002 and the servers 1004. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments, from which numerous permutations and configurations will be apparent.

Example 1 is an apparatus comprising: a privileged component; a hardware accelerator; and a security broker, at least a portion of which is in hardware decoupled from the hardware accelerator, configured to: provide interfaces between the hardware accelerator and the privileged component; receive an instruction from the hardware accelerator targeting the privileged component; validate the instruction based on a configuration; and upon determining the instruction is not validated, restrict the instruction from further processing.

Example 2 includes the subject matter of Example 1, the security broker configured to validate the instruction by one or more of: a protocol validation operation performed on the instruction; a network address permission check performed on the instruction; a memory address range permission check performed on the instruction; a monitoring of a bandwidth used by the hardware accelerator on one of the interfaces; a monitoring of thermal energy generated by the hardware accelerator; and a monitoring of power used by the hardware accelerator.

Example 3 includes the subject matter of Example 1, the security broker further configured to: upon determining the instruction is validated, forward the instruction to the privileged component.

Example 4 includes the subject matter of Example 1, the security broker further configured to, responsive to determining the instruction is not validated, perform one or more of: restore the apparatus to a last known good state by resetting the hardware accelerator; create an entry in a system log describing the instruction; generate and transmit a notification describing the instruction; trigger an application programming interface (API) to report the instruction; and cause the hardware accelerator to enter a low power state.

Example 5 includes the subject matter of Example 1, the hardware accelerator comprising an FPGA-based accelerator, the FPGA-based accelerator disposed on a first die, the security broker implemented as one of: (i) a chiplet, (ii) a second FPGA on a second die, (iii) the second FPGA on the first die and decoupled from the FPGA-based accelerator, (iv) an application specific integrated circuit (ASIC) separate from the FPGA-based accelerator, (v) a part of a baseboard management controller (BMC).

Example 6 includes the subject matter of Example 1, the privileged component comprising one or more of: (i) a processor, (ii) a memory, (iii) a storage device, (iv) a network interface, (v) a data, (vi) a graphics processor, and (vii) a Peripheral Component Interconnect Express (PCIe) device.

Example 7 includes the subject matter of Example 1, the interfaces comprising at least a first interface between the privileged component and the security broker, and a second interface between the security broker and the hardware accelerator.

Example 8 includes the subject matter of Example 1, the security broker further configured to: upon determining the hardware accelerator has not responded to a Peripheral Component Interconnect Express (PCIe) request from the privileged component: generate a response to the PCIe request from the privileged component on behalf of the hardware accelerator; and transmit the generated response to the privileged component.

Example 9 includes the subject matter of Example 1, the security broker configured to restrict the hardware accelerator from initiating Peripheral Component Interconnect Express (PCIe) transactions with the privileged component.

Example 10 includes the subject matter of Example 1, the instruction generated based on an untrusted third party accessing the hardware accelerator in a cloud computing environment.

Example 11 is a method, comprising: receiving, by a security broker, an instruction from a hardware accelerator targeting a privileged component of a computing device, the security broker comprising hardware decoupled from the hardware accelerator and providing interfaces between the hardware accelerator and the privileged component; validating, by the security broker, the instruction based on a configuration; and upon determining the instruction is not validated, restricting, by the security broker, the instruction from further processing by the computing device Example 12 includes the subject matter of Example 11, wherein validating the instruction comprises one or more of: a protocol validation operation performed on the instruction; a network address permission check performed on the instruction; a memory address range permission check performed on the instruction; a monitoring of a bandwidth used by the hardware accelerator on one of the interfaces; a monitoring of thermal energy generated by the hardware accelerator; and a monitoring of power used by the hardware accelerator.

Example 13 includes the subject matter of Example 11, further comprising: determining, by the security broker, that the instruction is validated; and forwarding, by the security broker, the instruction to the privileged component.

Example 14 includes the subject matter of Example 11, further comprising, responsive to determining the instruction is not validated, performing, by the security broker, one or more of: restoring the computing device to a last known good state by resetting the hardware accelerator; creating an entry in a system log describing the instruction; generating and transmitting a notification describing the instruction; triggering an application programming interface (API) to report the instruction; and causing the hardware accelerator to enter a low power state.

Example 15 includes the subject matter of Example 11, the hardware accelerator comprising an FPGA-based accelerator, the FPGA-based accelerator disposed on a first die, the security broker implemented as one of: (i) a chiplet, (ii) a second FPGA on a second die, (iii) the second FPGA on the first die and decoupled from the FPGA-based accelerator, (iv) an application specific integrated circuit (ASIC)

separate from the FPGA-based accelerator, (v) a part of a baseboard management controller (BMC).

Example 16 includes the subject matter of Example 11, the privileged component comprising one or more of: (i) a processor, (ii) a memory, (iii) a storage device, (iv) a network interface, (v) a data, (vi) a graphics processor, and (vii) a Peripheral Component Interconnect Express (PCIe) device.

Example 17 includes the subject matter of Example 11, the interfaces comprising at least a first interface between the privileged component and the security broker and a second interface between the security broker and the hardware accelerator.

Example 18 includes the subject matter of Example 11, further comprising: upon determining the hardware accelerator has not responded to a Peripheral Component Interconnect Express (PCIe) request from the privileged component: generating, by the security broker, a response to the PCIe request from the privileged component on behalf of the hardware accelerator; and transmitting, by the security broker, the generated response to the privileged component.

Example 19 includes the subject matter of Example 11, the security broker configured to restrict the hardware accelerator from initiating Peripheral Component Interconnect Express (PCIe) transactions with the privileged component.

Example 20 includes the subject matter of Example 11, the instruction generated based on an untrusted third party accessing the hardware accelerator in a cloud computing environment.

Example 21 is a machine-readable storage medium comprising instructions that when executed by a computing device, cause the computing device to: receive, by a security broker, an instruction from a hardware accelerator targeting a privileged component of the computing device, the security broker comprising hardware decoupled from the hardware accelerator and providing interfaces between the hardware accelerator and the privileged component; validate, by the security broker, the instruction based on a configuration; and upon determining the instruction is not validated, restricting, by the security broker, the instruction from further processing by the computing device.

Example 22 includes the subject matter of Example 21, the security broker configured to validate the instruction by one or more of: a protocol validation operation performed on the instruction; a network address permission check performed on the instruction; a memory address range permission check performed on the instruction; a monitoring of a bandwidth used by the FPGA-based accelerator on one of the interfaces; a monitoring of thermal energy generated by the hardware accelerator; and a monitoring of power used by the hardware accelerator.

Example 23 includes the subject matter of Example 21, further comprising instructions that when executed by the computing device, cause the computing device to: determine, by the security broker, that the instruction is validated; and forward, by the security broker, the instruction to the privileged component.

Example 24 includes the subject matter of Example 21, further comprising instructions that when executed by the computing device, cause the computing device to: perform, by the security broker responsive to determining the instruction is not validated, one or more of: restoring the computing device to a last known good state by resetting the hardware accelerator; creating an entry in a system log describing the instruction; generating and transmitting a notification describing the instruction; triggering an application programming interface (API) to report the instruction; and causing the hardware accelerator to enter a low power state.

Example 25 includes the subject matter of Example 21, the hardware accelerator comprising an FPGA-based accelerator, the FPGA-based accelerator disposed on a first die, the security broker implemented as one of: (i) a chiplet, (ii) a second FPGA on a second die, (iii) the second FPGA on the first die and decoupled from the FPGA-based accelerator, (iv) an application specific integrated circuit (ASIC) separate from the FPGA-based accelerator, (v) a part of a baseboard management controller (BMC).

Example 26 includes the subject matter of Example 21, the privileged component comprising one or more of: (i) a processor, (ii) a memory, (iii) a storage device, (iv) a network interface, (v) a data, (vi) a graphics processor, and (vii) a Peripheral Component Interconnect Express (PCIe) device.

Example 27 includes the subject matter of Example 21, the interfaces comprising at least a first interface between the privileged component and the security broker and a second interface between the security broker and the hardware accelerator.

Example 28 includes the subject matter of Example 21, the security broker further configured to: upon determining the hardware accelerator has not responded to a Peripheral Component Interconnect Express (PCIe) request from the privileged component: generate a response to the PCIe request from the privileged component on behalf of the hardware accelerator; and transmit the generated response to the privileged component.

Example 29 includes the subject matter of Example 21, the security broker configured to restrict the hardware accelerator from initiating Peripheral Component Interconnect Express (PCIe) transactions with the privileged component.

Example 30 includes the subject matter of Example 21, the instruction generated based on an untrusted third party accessing the hardware accelerator in a cloud computing environment.

Example 31 is an apparatus comprising means for a privileged component; means for a hardware accelerator; means for a security broker, at least a portion of which is in hardware decoupled from the hardware accelerator; means for providing interfaces between the hardware accelerator and the privileged component; means for receiving an instruction from the hardware accelerator targeting the privileged component; means for validating the instruction based on a configuration; and upon determining the instruction is not validated, means for restricting the instruction from further processing.

Example 32 includes the subject matter of Example 31, the means for validating the instruction comprising one or more of: means for performing a protocol validation operation on the instruction; means for performing a network address permission check on the instruction; means for performing a memory address range permission check on the instruction; means for monitoring a bandwidth used by the hardware accelerator on one of the interfaces; means for monitoring thermal energy generated by the FPGA; and means for monitoring of power used by the hardware accelerator.

Example 33 includes the subject matter of Example 31, further comprising: means for determining that the instruction is validated; and means for forwarding the instruction to the privileged component.

Example 34 includes the subject matter of Example 31, further comprising, responsive to determining the instruction is not validated, one or more of: means for restoring the computing device to a last known good state by resetting the hardware accelerator; means for creating an entry in a system log describing the instruction; means for generating and transmitting a notification describing the instruction; means for triggering an application programming interface (API) to report the instruction; and means for causing the hardware accelerator to enter a low power state.

Example 35 includes the subject matter of one or more of Examples 31-34, the means for the hardware accelerator comprising a FPGA, the means for the FPGA-based accelerator disposed on a first die, the means for the security broker comprising one or more of: (i) a chiplet, (ii) a second FPGA on a second die, (iii) the second FPGA on the first die and decoupled from the FPGA-based accelerator, (iv) an application specific integrated circuit (ASIC) separate from the FPGA-based accelerator, (v) a part of a baseboard management controller (BMC).

Example 36 includes the subject matter of Example 31, the means for privileged component comprising one or more of: (i) a processor, (ii) a memory, (iii) a storage device, (iv) a network interface, (v) a data, (vi) a graphics processor, and (vii) a Peripheral Component Interconnect Express (PCIe) device.

Example 37 includes the subject matter of Example 31, the interfaces comprising at least a first interface between the privileged component and the security broker and a second interface between the security broker and the hardware accelerator.

Example 38 includes the subject matter of Example 31, further comprising: means for determining the hardware accelerator has not responded to a Peripheral Component Interconnect Express (PCIe) request from the privileged component; means for generating a response to the PCIe request from the privileged component on behalf of the hardware accelerator; and means for transmitting, by the security broker, the generated response to the privileged component.

Example 39 includes the subject matter of Example 31, further comprising means for restricting the hardware accelerator from initiating Peripheral Component Interconnect Express (PCIe) transactions with the privileged component.

Example 40 includes the subject matter of Example 31, the instruction generated based on an untrusted third party accessing the hardware accelerator in a cloud computing environment.

Example 41 includes the subject matter of Examples 1-40, the hardware accelerator comprising an FPGA-based accelerator.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. An apparatus, comprising:
  an interface to receive, from a hardware accelerator, an instruction including an indication of a privileged component;
  circuitry, the circuitry arranged to:
    determine whether the instruction is invalid based on a configuration, the configuration to provide a set of security rules to determine whether the instruction complies with one or more security features of a system;
    apply a restriction to the instruction based on a determination that the instruction is invalid;
    determine a set of associated system management operations to restore the system to a secure operating state before receipt of the invalid instruction using state information stored in the configuration; and
    perform the set of associated system management operations.

2. The apparatus of claim 1, the circuitry to determine whether the instruction is invalid based on at least one of:
  a protocol validation operation;
  a network address permission check;
  a memory address range permission check;
  an amount of bandwidth used by the hardware accelerator;
  an amount of thermal energy generated by the hardware accelerator; or
  an amount of power used by the hardware accelerator.

3. The apparatus of claim 1, the circuitry to forward the instruction to the privileged component based on a determination that the instruction is valid.

4. The apparatus of claim 1, the circuitry to, at least one of the following:
  send a control signal to the hardware accelerator to cause the hardware accelerator to reset based on a determination that the instruction is invalid;
  create an entry in a system log based on a determination that the instruction is invalid, the entry comprising an indication of the instruction;
  generate and transmit a notification based on a determination that the instruction is invalid, the notification comprising an indication of the instruction;
  report the instruction via an application programming interface (API) based on a determination that the instruction is invalid; or
  send a control signal to the hardware accelerator to cause the hardware accelerator to enter a low power state based on a determination that the instruction is invalid.

5. The apparatus of claim 1, the circuitry comprising an interface to couple to the privileged component.

6. The apparatus of claim 1, the circuitry to:
  determine whether the hardware accelerator has responded to a Peripheral Component Interconnect Express (PCIe) request from the privileged component;
  generate a response to the PCIe request from the privileged component on behalf of the hardware accelerator based on a determination that the hardware accelerator has not responded to the PCIe request from the privileged component; and
  transmit the response to the privileged component.

7. The apparatus of claim 1, the circuitry to restrict the hardware accelerator from initiating Peripheral Component Interconnect Express (PCIe) transactions with the privileged component.

8. The apparatus of claim 1, wherein the instruction is associated with an untrusted third party accessing the hardware accelerator in a cloud computing environment.

9. At least one non-transitory computer-readable storage medium, storing instructions that when executed by a security broker coupled to a hardware accelerator and a privileged component, cause the security broker to:

determine whether an instruction received from the hardware accelerator is invalid based on a configuration, the configuration to provide a set of security rules to determine whether the instruction complies with one or more security features of a system, the instruction comprising an indication of the privileged component;
apply a restriction to the instruction based on a determination that the instruction is invalid;
determine a set of associated system management operations to restore the system to a secure operating state before receipt of the invalid instruction using state information stored in the configuration; and
perform the set of associated system management operations.

10. The at least one non-transitory computer-readable storage medium of claim 9, the instructions, when executed further cause the security broker to determine whether the instruction is invalid based on at least one of:
a protocol validation operation;
a network address permission check;
a memory address range permission check;
an amount of bandwidth used by the hardware accelerator;
an amount of thermal energy generated by the hardware accelerator; or
an amount of power used by the hardware accelerator.

11. The at least one non-transitory computer-readable storage medium of claim 9, the instructions, when executed further cause the security broker to forward the instruction to the privileged component based on a determination that the instruction is valid.

12. The at least one non-transitory computer-readable storage medium of claim 9, the instructions, when executed further cause the security broker to:
send a control signal to the hardware accelerator to cause the hardware accelerator to reset based on a determination that the instruction is invalid;
create an entry in a system log based on a determination that the instruction is invalid, the entry comprising an indication of the instruction;
generate and transmit a notification based on a determination that the instruction is invalid, the notification comprising an indication of the instruction;
report the instruction via an application programming interface (API) based on a determination that the instruction is invalid; or
send a control signal to the hardware accelerator to cause the hardware accelerator to enter a low power state based on a determination that the instruction is invalid.

13. The at least one non-transitory computer-readable storage medium of claim 9, the instructions, when executed further cause the security broker to:
determine whether the hardware accelerator has responded to a Peripheral Component Interconnect Express (PCIe) request from the privileged component;
generate a response to the PCIe request from the privileged component on behalf of the hardware accelerator based on a determination that the hardware accelerator has not responded to the PCIe request from the privileged component; and
transmit the response to the privileged component.

14. The at least one non-transitory computer-readable storage medium of claim 9, the instructions, when executed further cause the security broker to restrict the hardware accelerator from initiating Peripheral Component Interconnect Express (PCIe) transactions with the privileged component.

15. A system, comprising:
a hardware accelerator; and
an apparatus coupled to the hardware accelerator, the apparatus comprising:
an interface to receive an instruction from the hardware accelerator; and
circuitry coupled with the interface, the circuitry to:
determine whether the instruction received from the hardware accelerator is invalid based on a configuration, the configuration to provide a set of security rules to determine whether the instruction complies with one or more security features of the system, the instruction comprising an indication of a privileged component;
apply a restriction to the instruction based on a determination that the instruction is invalid;
determine a set of associated system management operations to restore the system to a secure operating state before receipt of the invalid instruction using state information stored in the configuration; and
perform the set of associated system management operations.

16. The system of claim 15, the circuitry to determine whether the instruction is invalid based on at least one of:
a protocol validation operation;
a network address permission check;
a memory address range permission check;
an amount of bandwidth used by the hardware accelerator;
an amount of thermal energy generated by the hardware accelerator; or
an amount of power used by the hardware accelerator.

17. The system of claim 15, the circuitry to forward the instruction to the privileged component based on a determination that the instruction is valid.

18. The system of claim 15, the circuitry to, at least one of the following:
send a control signal to the hardware accelerator to cause the hardware accelerator to reset based on a determination that the instruction is invalid;
create an entry in a system log based on a determination that the instruction is invalid, the entry comprising an indication of the instruction;
generate and transmit a notification based on a determination that the instruction is invalid, the notification comprising an indication of the instruction;
report the instruction via an application programming interface (API) based on a determination that the instruction is invalid; or
send a control signal to the hardware accelerator to cause the hardware accelerator to enter a low power state based on a determination that the instruction is invalid.

19. The system of claim 15, comprising an interface to couple to the privileged component.

20. The system of claim 15, the circuitry to:
determine whether the hardware accelerator has responded to a Peripheral Component Interconnect Express (PCIe) request from the privileged component;
generate a response to the PCIe request from the privileged component on behalf of the hardware accelerator based on a determination that the hardware accelerator has not responded to the PCIe request from the privileged component; and
transmit the response to the privileged component.

21. The system of claim 15, the hardware accelerator comprising an FPGA-based accelerator, the FPGA-based accelerator disposed on a first die, the circuitry implemented as one of: a chiplet, a second FPGA on a second die, the second FPGA on the first die and decoupled from the FPGA-based accelerator, an application specific integrated circuit (ASIC) separate from the FPGA-based accelerator, or a baseboard management controller (BMC).

22. A system, comprising:
a privileged component; and
an apparatus coupled to the privileged component, the apparatus comprising:
 an interface to receive an instruction from a hardware accelerator; and
 circuitry coupled with the interface, the circuitry to:
  determine whether the instruction received from a hardware accelerator is invalid based on a configuration, the configuration to provide a set of security rules to determine whether the instruction complies with one or more security features of the system, the instruction comprising an indication of the privileged component;
  apply a restriction to the instruction based on a determination that the instruction is invalid;
  determine a set of associated system management operations to restore the system to a secure operating state before receipt of the invalid instruction using state information stored in the configuration; and
  perform the set of associated system management operations.

23. The system of claim 22, the circuitry to forward the instruction to the privileged component based on a determination that the instruction is valid.

24. The system of claim 22, the circuitry to, at least one of the following:
send a control signal to the hardware accelerator to cause the hardware accelerator to reset based on a determination that the instruction is invalid;
create an entry in a system log based on a determination that the instruction is invalid, the entry comprising an indication of the instruction;
generate and transmit a notification based on a determination that the instruction is invalid, the notification comprising an indication of the instruction;
report the instruction via an application programming interface (API) based on a determination that the instruction is invalid; or
send a control signal to the hardware accelerator to cause the hardware accelerator to enter a low power state based on a determination that the instruction is invalid.

25. The system of claim 22, the privileged component comprising one or more of: a processor, memory, a network interface, a graphics processor, or a Peripheral Component Interconnect Express (PCIe) device.

* * * * *